(12) United States Patent
Liu et al.

(10) Patent No.: US 12,315,168 B2
(45) Date of Patent: May 27, 2025

(54) IMAGE SEGMENTATION METHOD AND APPARATUS AND STORAGE MEDIUM

(71) Applicant: Tencent Technology (Shenzhen) Company Limited, Guangdong (CN)

(72) Inventors: Luyan Liu, Guangdong (CN); Kai Ma, Guangdong (CN); Yefeng Zheng, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 647 days.

(21) Appl. No.: 17/587,825

(22) Filed: Jan. 28, 2022

(65) Prior Publication Data

US 2022/0148191 A1 May 12, 2022

Related U.S. Application Data

(63) Continuation of application No. PCT/CN2020/124673, filed on Oct. 29, 2020.

(30) Foreign Application Priority Data

Feb. 10, 2020 (CN) .......................... 202010084625.6

(51) Int. Cl.
*G06T 7/174* (2017.01)
*G06N 3/08* (2023.01)
(Continued)

(52) U.S. Cl.
CPC .............. *G06T 7/174* (2017.01); *G06N 3/08* (2013.01); *G06T 7/143* (2017.01); *G06T 7/162* (2017.01);
(Continued)

(58) Field of Classification Search
CPC .......... G06N 3/045; G06N 3/047; G06N 3/08; G06N 3/088; G06T 2207/10056;
(Continued)

(56) References Cited

U.S. PATENT DOCUMENTS 7,773,800 B2    8/2010   Liu
10,970,589 B2 *   4/2021   Bousmalis ............ G06F 18/241
(Continued)

FOREIGN PATENT DOCUMENTS

CN    108197670 A    6/2018
CN    108256561 A    7/2018
(Continued)

OTHER PUBLICATIONS

Decision to Grant a Patent issued in Japanese Application No. 2022-523505, issued Apr. 4, 2023, 6 pages.
(Continued)

*Primary Examiner* — Zhiyu Lu
(74) *Attorney, Agent, or Firm* — ArentFox Schiff LLP

(57) ABSTRACT

An image segmentation method includes obtaining target domain images and source domain images, and segmenting the source domain images and the target domain images by using a generative network in a first generative adversarial network. The method further includes segmenting the source domain images and the target domain images by using a generative network in a second generative adversarial network, and determining a first source domain image and a second source domain image according to source domain segmentation losses, and determining a first target domain image and a second target domain image according to target domain segmentation losses. The method also includes performing cross training on the first generative adversarial network and the second generative adversarial network to obtain a trained first generative adversarial network; and
(Continued)

segmenting a to-be-segmented image based on the generative network in the trained first generative adversarial network.

20 Claims, 6 Drawing Sheets

(51) Int. Cl.
  *G06T 7/143* (2017.01)
  *G06T 7/162* (2017.01)
(52) U.S. Cl.
  CPC .............. *G06T 2207/20072* (2013.01); *G06T 2207/20076* (2013.01); *G06T 2207/20081* (2013.01); *G06T 2207/20084* (2013.01)
(58) Field of Classification Search
  CPC . G06T 2207/20072; G06T 2207/20076; G06T 2207/20081; G06T 2207/20084; G06T 2207/30041; G06T 7/11; G06T 7/143; G06T 7/162; G06T 7/174; Y02T 10/40
  See application file for complete search history.

(56) References Cited

U.S. PATENT DOCUMENTS

| | | | |
|---|---|---|---|
| 2019/0220977 | A1 | 7/2019 | Zhou et al. |
| 2021/0383538 | A1* | 12/2021 | Deasy ................ G06T 3/4053 |

FOREIGN PATENT DOCUMENTS

| | | |
|---|---|---|
| CN | 109255390 A | 1/2019 |
| CN | 109345455 A | 2/2019 |
| CN | 109829894 A | 5/2019 |
| CN | 109902809 A | 6/2019 |
| CN | 110148142 A | 8/2019 |
| CN | 110322446 A | 10/2019 |
| CN | 110490876 A | 11/2019 |
| CN | 110490884 A | 11/2019 |
| CN | 111340819 A | 6/2020 |
| JP | 2019207491 A | 12/2019 |
| WO | 2018200072 A1 | 11/2018 |
| WO | 2020028382 A1 | 2/2020 |

OTHER PUBLICATIONS

Junlin Yang et al., "Domain-Agnostic Learning With Anatomy-Consistent Embedding for Cross-Modality Liver Segmentation", 2019 IEEE/CVF International Conference on Computer Vision Workshop (ICCVW), IEEE, Oct. 27, 2019, pp. 323-331.

Chenjie Ge et al., "Cross-modality augmentation of brain MR images using a novel pairwise generative adversarial network for enhanced glioma classification", 2019 IEEE International Conference on Image Processing (ICIP), IEEE, Aug. 26, 2019, pp. 559-563.

Zizhao Zhang et al., "Translating and Segmenting Multimodal Medical Volumes with Cycle- and Shape-Consistency Generative Adversarial Network", 2018 IEEE/CVF Conference on Computer Vision and Pattern Recognition, IEEE, Jun. 18, 2018, pp. 9242-9251.

Bo Han et al., "Co-teaching: Robust Training of Deep Neural Networks with Extremely Noisy Labels", arXiv, Cornell University, Oct. 30, 2018, pp. 1-13.

International Search Report and Written Opinion issued Jan. 27, 2021 in International Application No. PCT/CN2020/124673, citing documents AA and AO-AV therein, 12 pgs.

Tzeng, Eric, et al. Adversarial discriminative domain adaptation. In: CVPR, 2017, pp. 1-10.

Chen, Y., Wen, L., et al. Domain adaptive faster r-cnn for object detection in the wild. In: CVPR, 2018, pp. 1-10.

Zhang, Y., Zhaofan, Q., et al. Fully convolutional adaptation networks for semantic segmentation. In: CVPR, 2018, bages 1-9.

Kamnitsas, K., Baumgartner, C., et al. Unsupervised domain adaptation in brain lesion segmentation with adversarial networks. In: IPMI, 2017, pp. 1-13.

Guo Y., Shi H., et al. SpotTune: Transfer Learning through Adaptive Fine-tuning. In: CVPR, 2019, pp. 1-10.

Tsai Y., Hung W., et al. Learning to adapt structured output space for semantic segmentation. In: CVPR, 2018, pp. 1-11.

Luo Y., Zheng L., et al. Taking A Closer Look at Domain Shift: Category-level Adversaries for Semantics Consistent Domain Adaptation. In: CVPR, 2018, pp. 1-10.

Chen S., Shrivastava A., et al. Revisiting unreasonable effectiveness of data in deep learning era. In ICCV, pp. 843-852, 2017, pp. 1-13.

Han B., Yao Q, et al. Co-teaching: Robust Training of Deep Neural Networks with Extremely Noisy Labels. In: NIPS, 2018, pp. 1-11.

Zhu H., Shi J, et al. Pick-and-Learn: Automatic Quality Evaluation for Noisy-Labeled Image Segmentation. In: MICCAI, 2019, pp. 1-9.

Wang X., Wang S., et al. Co-Mining: Deep Face Recognition with Noisy Labels. In: CVPR, 2019, pp. 1-10.

Xue C., Dou Q., Robust Learning at Noisy Labeled Medical Images: Applied to Skin Lesion Classification.In ISBI, 2019, pp. 1-4.

Wang, S., Yu, L., et al. Patch-based output space adver- sarial learning for joint optic disc and cup segmentation. IEEE TMI, 2019, pp. 1-11.

Wang, S., Yu, L., et al. Boundary and Entropy-driven Adversarial Learning for Fundus Image Segmentation. In: MICCAI, 2019, pp. 1-9.

* cited by examiner

IMAGE SEGMENTATION METHOD AND APPARATUS AND STORAGE MEDIUM

RELATED APPLICATIONS

This application is a continuation of International Application No. PCT/CN2020/124673, filed on Oct. 29, 2020, which claims priority to Chinese Patent Application No. 202010084625.6, entitled "IMAGE SEGMENTATION METHOD AND APPARATUS AND STORAGE MEDIUM" and filed on Feb. 10, 2020. The disclosures of the prior applications are hereby incorporated by reference in their entirety.

FIELD OF THE TECHNOLOGY

This application relates to the field of communication technologies, including an image segmentation method and apparatus and a storage medium.

BACKGROUND OF THE DISCLOSURE

With the development of artificial intelligence (AI), the application of AI in the medical field has become more and more extensive. Significant results have been achieved in various medical image analysis tasks such as image classification, lesion detection, target segmentation, and medical image analysis, especially in the segmentation of medical images. For example, AI technologies may be applied to segment an optic cup and an optic disc from a retinal fundus image. A current AI solution for segmenting an optic cup and an optic disc is mainly based on a deep learning network. Specifically, a deep learning network that can segment an optic cup and an optic disc may be trained, then a fundus image to be segmented is inputted into the trained deep learning network to extract features, and an optic cup and an optic disc are segmented based on the features to obtain a segmentation result, for example, a glaucoma segmentation image, or the like.

During the research and practice of the related art, it has been found that the performance of a trained deep convolutional neural network model usually degrades during a test on unprecedented data, especially when there is a significant domain shift between training (source domain) data and testing (target domain) data. A domain shift is a common problem in the biomedical field. Because biomedical images are acquired by different imaging modalities or different settings of the same device, different acquired images have variability in texture, color, shape, and the like. Therefore, the accuracy of segmentation is not high.

SUMMARY

According to various embodiments provided in this application, an image segmentation method and apparatus and a storage medium are provided.

In an embodiment, an image segmentation method includes obtaining plural target domain images and plural source domain images that are labeled with target information, and segmenting one or more of the source domain images and the target domain images by using a generative network in a first generative adversarial network to respectively determine first source domain segmentation losses and first target domain segmentation losses. The method further includes segmenting one or more of the source domain images and the target domain images by using a generative network in a second generative adversarial network to respectively determine second source domain segmentation losses and second target domain segmentation losses, and determining a first source domain image and a second source domain image according to the first source domain segmentation losses and the second source domain segmentation losses, and determining a first target domain image and a second target domain image according to the first target domain segmentation losses and the second target domain segmentation losses. The method also includes performing cross training on the first generative adversarial network and the second generative adversarial network by using the first source domain image, the first target domain image, the second source domain image, and the second target domain image to obtain a trained first generative adversarial network, and segmenting a to-be-segmented image based on the generative network in the trained first generative adversarial network to obtain a segmentation result.

In an embodiment, an image segmentation apparatus includes processing circuitry configured to obtain plural target domain images and plural source domain images that are labeled with target information, and segment one or more of the source domain images and the target domain images by using a generative network in a first generative adversarial network to respectively determine first source domain segmentation losses and first target domain segmentation losses. The processing circuitry is further configured to segment one or more of the source domain images and the target domain images by using a generative network in a second generative adversarial network to respectively determine second source domain segmentation losses and second target domain segmentation losses, and determine a first source domain image and a second source domain image according to the first source domain segmentation losses and the second source domain segmentation losses, and determine a first target domain image and a second target domain image according to the first target domain segmentation losses and the second target domain segmentation losses. The processing circuitry is also configured to perform cross training on the first generative adversarial network and the second generative adversarial network by using the first source domain image, the first target domain image, the second source domain image, and the second target domain image to obtain a trained first generative adversarial network, and segment a to-be-segmented image based on the generative network in the trained first generative adversarial network to obtain a segmentation result.

In an embodiment, a non-transitory computer-readable storage medium stores computer-readable instructions thereon which, when executed by a processor, cause the processor to perform an image segmentation method. The method includes obtaining plural target domain images and plural source domain images that are labeled with target information, and segmenting one or more of the source domain images and the target domain images by using a generative network in a first generative adversarial network to respectively determine first source domain segmentation losses and first target domain segmentation losses. The method further includes segmenting one or more of the source domain images and the target domain images by using a generative network in a second generative adversarial network to respectively determine second source domain segmentation losses and second target domain segmentation losses, and determining a first source domain image and a second source domain image according to the first source domain segmentation losses and the second source domain segmentation losses, and determining a first target domain image and a second target domain image according to the first target domain segmentation losses and the second target domain segmentation losses. The method also includes performing cross training on the first generative adversarial network and the second generative adversarial network by using the first source domain image, the first target domain image, the second source domain image, and the second target domain image to obtain a trained first generative adversarial network, and segmenting a to-be-segmented image based on the generative network in the trained first generative adversarial network to obtain a segmentation result.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions in the embodiments of this application more clearly, the following briefly describes accompanying drawings describing the embodiments. The accompanying drawings in the following descriptions show merely some embodiments of this application, and a person skilled in the art may still derive other accompanying drawings from these accompanying drawings.

DESCRIPTION OF EMBODIMENTS

Figure 1A:
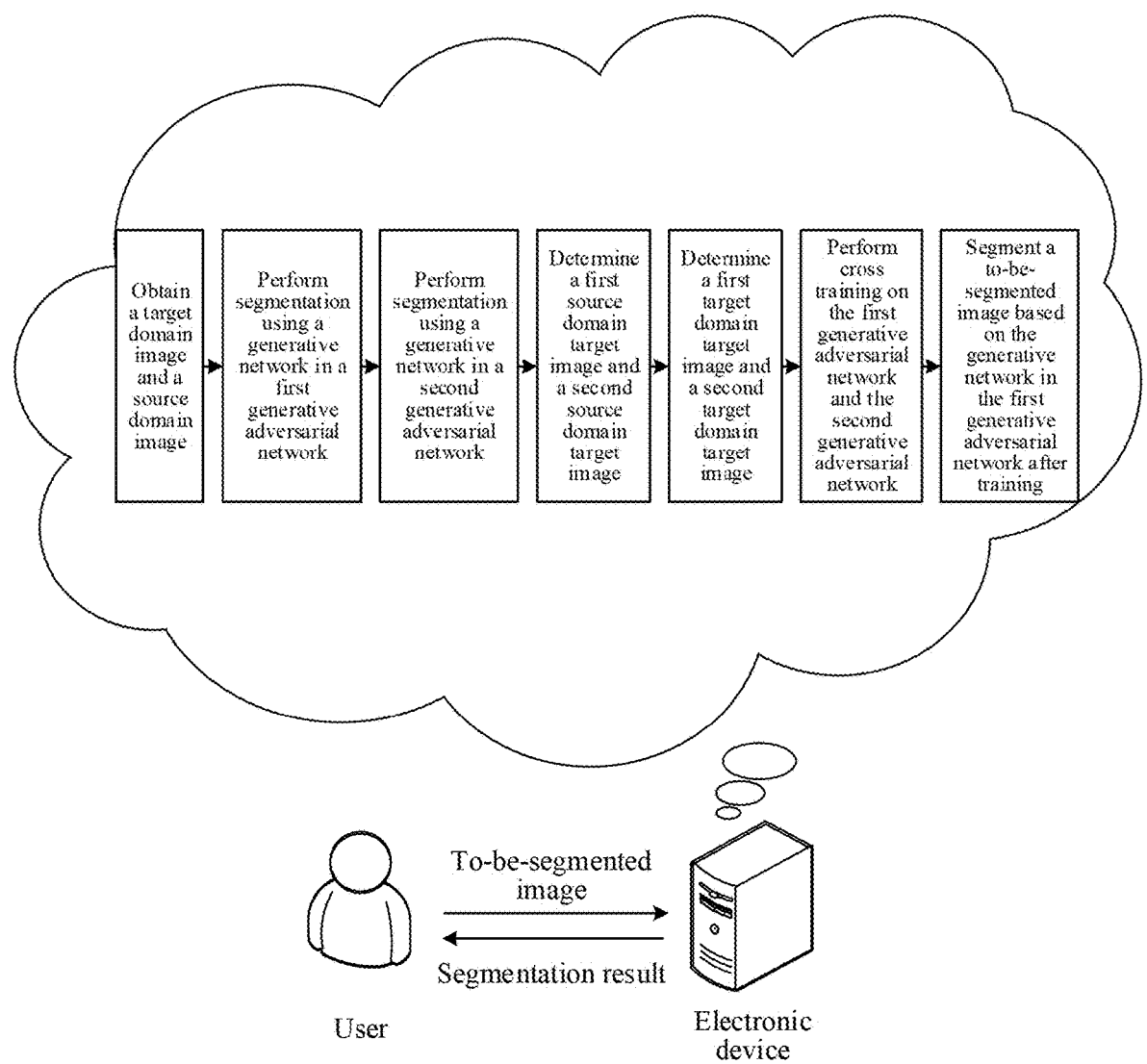
FIG. 1a is a schematic diagram of a scenario of an image segmentation method according to an embodiment of this application.

The technical solutions in embodiments of this application are described in the following with reference to the accompanying drawings in the embodiments of this application. The described embodiments are merely some, rather than all, of the embodiments of this application. All other embodiments obtained by a person skilled in the art based on the embodiments of this application shall fall within the protection scope of this application.

Embodiments of this application provide an image segmentation method and apparatus and a storage medium. The image segmentation method may be integrated in an electronic device. The electronic device may be a server or may be a device such as a terminal.

The image segmentation method provided in this embodiment of this application relates to the direction of CV in the AI field, and may implement segmentation of a fundus image of the CV technologies of AI to obtain a segmentation result.

AI is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making. The AI technology is a comprehensive discipline, and relates to a wide range of fields including both hardware-level technologies and software-level technologies. AI software technologies mainly include directions such as a computer vision (CV) technology, and machine learning (ML)/deep learning.

CV technology is a science that studies how to use a machine to "see", and furthermore, refers to using a computer to replace human eyes for performing machine vision, such as recognition and measurement, on a target, and further perform image processing, so that the computer processes an image into an image more suitable for human eyes to observe, or an image transmitted to an instrument for detection. As a scientific discipline, CV studies related theories and technologies and attempts to establish an AI system that can obtain information from images or multi-dimensional data. The CV technology usually includes technologies such as image processing and image recognition, and further include biological feature recognition technologies such as common face recognition and human pose recognition.

In this embodiment of this application, image segmentation is a CV technology and process of segmenting an image into several particular areas having special properties, and specifying a target of interest. In this embodiment of this application, a medical image such as a fundus image is mainly segmented, to find a target object. For example, an optic cup, an optic disc or the like is segmented from a fundus image. The segmented target object may be subsequently analyzed by health care professionals or other medical experts to perform a further corresponding operation.

For example, referring to FIG. 1a, first, the electronic device integrated with the image segmentation apparatus first obtains a target domain image and a source domain image that is labeled with target information (or, for example, plural target domain images and plural source domain images), then segments the source domain image and the target domain image (or, for example, segments each of the plural target domain images and the plural source domain images) by using a generative network in a first generative adversarial network to respectively determine a first source domain segmentation loss (or, for example, first source domain segmentation losses) and a first target domain segmentation loss (or, for example, first target domain segmentation losses), segments the source domain image and the target domain image (or, for example, segments each of the plural target domain images and the plural source domain images) by using a generative network in a second generative adversarial network to respectively determine a second source domain segmentation loss (or, for example, second source domain segmentation losses) and a second target domain segmentation loss (or, for example, first target domain segmentation losses), next, determines a first source domain target image (or first source domain image) and a second source domain target image (or second source domain image) according to the first source domain segmentation loss and the second source domain segmentation loss (or, for example, the first source domain segmentation losses and the second source domain segmentation losses), determines a first target domain target image (or a first target domain image) and a second target domain target image (or a second target domain image) according to the first target domain segmentation loss and the second target domain segmentation loss (or, for example, the first target domain segmentation losses and the second target domain segmentation losses), then performs cross training on the first generative adversarial network and the second generative adversarial network by using the first source domain target image, the first target domain target image, the second source domain target image, and the second target domain target image to obtain the first generative adversarial network after training (or a trained first generative adversarial network), and then segments a to-be-segmented image based on the generative network in the first generative adversarial network after training to obtain a segmentation result.

In the solution, two generative adversarial networks have different structures and learning capabilities and may perform mutual learning and mutual supervision, and a clean target image is selected from one network and provided to the peer network to continue with training, thereby effectively improving the accuracy of image segmentation.

In this embodiment, a description is provided from the perspective of the image segmentation apparatus. The image segmentation apparatus may be specifically integrated in an electronic device. The electronic device may be a server or may be a terminal or may be a system including a server and a terminal. When the electronic device is a system including a server and a terminal, the image segmentation method in the embodiments of this application implements interaction through the terminal and the server.

The terminal may be specifically a desktop terminal or a mobile terminal. The mobile terminal may be specifically at least one of a mobile phone, a tablet computer, a notebook computer or the like. The server may be implemented by an independent server or implemented by a server cluster including a plurality of servers.

Figure 1B:
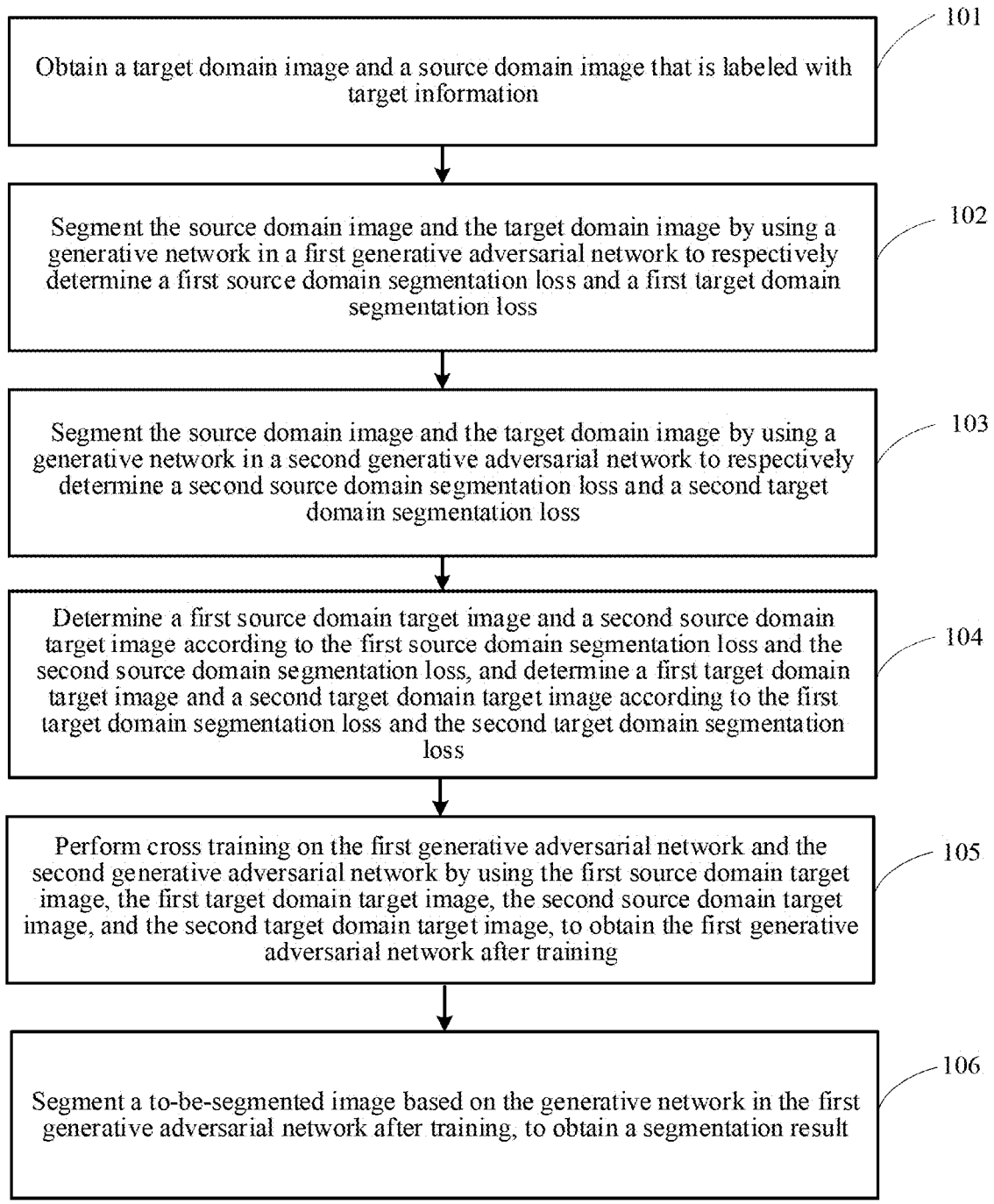
FIG. 1b is a flowchart of an image segmentation method according to an embodiment of this application.

As shown in FIG. 1b, a specific procedure of the image segmentation method may be as follows.

In step 101, a target domain image and a source domain image that is labeled with target information are obtained. In an embodiment, step 101 includes obtaining plural target domain images and plural source domain images that are labeled with target information.

The source domain image is a medical image that may provide rich annotation information. The target domain image is a medical image that belongs to the field of a test dataset and lacks annotation information. For example, the source domain image may be specifically obtained by performing image acquisition on the tissue of a living body by a medical image acquisition device such as a Computed Tomography (CT) device or a Magnetic Resonance Imaging (MRI) device. The image is annotated by a professional, for example, annotated by an imaging physician and provided to the image segmentation apparatus. That is, the image segmentation apparatus may specifically receive a medical image sample transmitted by the medical image acquisition device.

The medical image is an image of the internal tissue of a living body or a part of a living body acquired in a non-invasive manner in medical treatment or medical research, for example, an image of the human brain, gut, liver, heart, throat or vagina. The image may be a CT image, an MRI image, a positron emission tomography image or the like. The living body is an independent individual with a life form, for example, a human or an animal. The source domain image may be an image that has been acquired by the medical image acquisition device and is obtained through various channels, for example, from a database, a network or the like, and may be an image sample obtained by performing annotation with specific meanings on an image by a professional, or may be an image sample without any processing.

In step 102, the source domain image and the target domain image are segmented by using a generative network in a first generative adversarial network to respectively determine a first source domain segmentation loss and a first target domain segmentation loss. In an embodiment, step 102 includes segmenting each of the source domain images and the target domain images by using a generative network in a first generative adversarial network to respectively determine first source domain segmentation losses and first target domain segmentation losses.

The structure and the parameters of the first generative adversarial network may be set and adjusted according to an actual case. For example, the generative network in the first generative adversarial network may use DeepLabv2 with a residual network 101 (ResNet 101) being the main framework as a basic model to implement a preliminary segmentation result. In addition, a spatial pyramid (Atrous Spatial Pyramid Pooling, ASPP) structure is added to enrich multi-scale information of a feature map. To enhance the feature expression capability of the network, a Dual Attention Network (DANet)-based attention mechanism is provided, to learn how to capture context dependence between a pixel and a feature layer channel, and connect an output of an attention module and an output of the spatial pyramid structure to generate a final spatial segmentation feature. A discriminative network in the first generative adversarial network may use a multilayer fully convolutional network to integrate segmentation probabilities of the source domain image and the target domain image into adversarial learning. One Leaky Rectified Linear Unit (ReLU) activation function layer may be added to each of all convolutional layers except the last layer, to eventually output a 2D result of a single channel. 0 and 1 respectively represent a source domain and a target domain.

For example, feature extraction may be specifically performed on the source domain image and the target domain image by using the generative network in the first generative adversarial network to respectively obtain feature information of a first source domain image and feature information of a first target domain image, target segmentation (i.e., segmentation) is performed on the source domain image based on the feature information of the first source domain image to determine the first source domain segmentation loss, and target segmentation is performed on the target domain image based on the feature information of the first target domain image to determine the first target domain segmentation loss.

The first source domain segmentation loss may be determined in a plurality of manners. For example, a weighted graph (distance map) of an adversarial noise label may be introduced into the source domain image. Because medical labels have greatly varied marks at a boundary position of a target area, to prevent a network from fitting a noise label, a new anti-noise segmentation loss is provided, useful pixel level information is learned from a noise label, and an area with noise at an edge is filtered out.

For example, the source domain image includes a noisy image and a noiseless image, and target segmentation may be specifically performed on the noisy image in the source domain image based on the feature information of the first source domain image to obtain a first noise segmentation probability; a weighted graph of the noisy image in the source domain image is obtained; a first noise segmentation loss is obtained according to the first noise segmentation probability and the weighted graph of the noisy image; target segmentation is performed on the noiseless image in the source domain image based on the feature information of the first source domain image to obtain a first noiseless segmentation probability; a first noiseless segmentation loss is obtained according to the first noiseless segmentation probability and a labeling result of the noiseless image; and the first source domain segmentation loss is determined based on the first noise segmentation loss and the first noiseless segmentation loss. A first noise segmentation result is generated according to the first noise segmentation probability.

Specific formulas of the first noise segmentation loss may be as follows:

$$L_{noise}(p, y) = 1 - \lambda_1 \sum_{i=1}^{k \times w \times c} (W(y_i)) \log(p_i) - \lambda_2 \frac{2 \sum_{i=1}^{h \times w \times c} (W(y_i)) p_i}{W(y_i)_i^2 + p_i^2}, \text{ and} \quad (1)$$

$$W(y_i) = \begin{cases} w_c + w_0 \times \exp\left(-\frac{(\max_{dis} - d(y_i))^2}{2 \times \delta^2}\right), & \text{if } dice_{co} \geq \mu \\ y_i, & \text{otherwise} \end{cases} \quad (2)$$

In Formula (1), h×w×c respectively represent a length, a width, and a class of image data, $\lambda_1$ and $\lambda_2$ are weight coefficients of two losses, $W(y_i)$ represents a weighted graph, the second term of the formula is based on a cross entropy loss, and the third term is based on a dice loss. In Formula (2), $w_c$ represents that a weighted weight value for balancing a class is also a weight coefficient. For each noise label $y_i$, a distance $d(y_i)$ between a pixel on a label and a closest boundary is calculated, and a maximum value $\max_{dis}$ of the distance $d(y_i)$ is acquired from a class level area. When two networks exchange clean data respectively considered having a small loss, $dice_{co}$ of predicted values of clean data by the two networks is calculated. When $dice_{co}$ is greater than a threshold $\mu$, it indicates that the two networks have a disagreement about the sample, and the sample is considered as a noisy sample (noisy data). The anti-noise segmentation loss is added to improve learning of the noisy sample, and a loss $L_{noise}$ of the networks is calculated, or otherwise, an original manner of a cross entropy and a dice loss is kept to calculate a loss. For a weight mapping $W(y_i)$, the center of each inter-class area has a relatively large weight, and a position closer to a boundary has a smaller weight. $L_{noise}$ allows the networks to capture a critical position at the center, and filters out differences on the boundary under various noise labels.

For a target domain dataset, there is no pixel level semantic label. Therefore, the entire task may be considered as an unsupervised image segmentation problem. In this application, in a manner of adding "self-supervision" information, a segmentation result of the target domain image is used to generate a pixel level pseudo label, and the pseudo label is applied to a next training stage. In a segmentation probability result of the target domain image, for any pixel, if a prediction confidence level of a class is greater than a confidence threshold, a pseudo label of a corresponding class is generated at the position of the pixel. An adaptive setting manner is used for the confidence threshold. Each class in the target domain image and each pseudo label in each sample are sorted. A pixel with the highest class level prediction confidence level and image level prediction confidence level is adaptively selected, to generate a pixel level pseudo label as cross supervision information of the next training stage. To ensure the accuracy of the generated pseudo label, an "easy to difficult" strategy is used, that is, a model is iteratively trained, to continuously generate a more accurate pseudo label.

For example, target segmentation may be specifically performed on the target domain image based on the feature information of the target domain image to obtain a first target domain segmentation probability; a first target domain segmentation result is generated according to the first target domain segmentation probability; and the first target domain segmentation loss is obtained according to the first target domain segmentation result and the target domain image.

Next, a first source domain segmentation probability $P_S$ and a first target domain segmentation probability $P_T$ of a segmentation result outputted by the generative network in the first generative adversarial network are simultaneously inputted into the discriminative network in the first generative adversarial network, an adversarial loss $L_D$ is calculated by using an information entropy result generated by $P_T$, and at the same time a parameter of the discriminative network is updated by maximising the adversarial loss. Subsequently, an error generated by an adversarial loss function is also transmitted back to the generative network, and a parameter of a segmentation network is updated by minimizing the adversarial loss. The objective is to make segmentation results predicted for the source domain image and the target domain image by the generative network increasingly similar, to implement field adaptivity.

For example, after a first source domain segmentation result and the first target domain segmentation result are obtained, the first source domain segmentation result and the first target domain segmentation result may be specifically discriminated by using the discriminative network in the first generative adversarial network to obtain a first discrimination result; and the first generative adversarial network is trained according to the first source domain segmentation result, the first target domain segmentation result, and the first discrimination result to obtain the first generative adversarial network after training.

The first source domain segmentation result and the first target domain segmentation result may be determined in a plurality of manners. For example, information entropy of the first target domain image may be calculated; and the first discrimination result is obtained by using the discriminative network in the first generative adversarial network and according to the first source domain segmentation result, the first target domain segmentation result, and the first target domain image.

There may be a plurality of manners of training the first generative adversarial network according to the first source domain segmentation result, the first target domain segmentation result, and the first discrimination result. For example, the first source domain segmentation loss may be specifically obtained according to the first source domain segmentation result and a labeling result of the first source domain image; the first target domain segmentation loss is obtained according to the first target domain segmentation result and the first target domain image; a first discrimination loss of the discriminative network is obtained according to the first source domain segmentation result and the first target domain segmentation result; and the first generative adversarial network is trained according to the first source domain segmentation loss, the first target domain segmentation loss, and the first discrimination loss to obtain the first generative adversarial network after training.

There may be a plurality of manners of training the first generative adversarial network according to the first source domain segmentation loss, the first target domain segmentation loss, and the first discrimination loss. For example, a minimal adversarial loss of the first generative adversarial network may be specifically built according to the first source domain segmentation loss and the first target domain segmentation loss; a maximal adversarial loss of the first generative adversarial network is built according to the first discrimination loss; and iterative training is performed on the first generative adversarial network based on the minimal adversarial loss and the maximal adversarial loss to obtain the first generative adversarial network after training.

Specific calculation formulas for minimizing the adversarial loss and maximizing the adversarial loss (that is, the entire target function is optimized through maximization and minimization) are as follows:

$$\min_G \max_D L_{seg} + L_D. \qquad (3)$$

For the source domain image $X_S$ and the target domain image $X_T$, $Y_S$ is a label of the source domain image, $\overline{Y}_T$ is a pseudo label generated for the target domain image during training, $L_{seg}$ is a loss function $P=G(X) \in R^{H \times W \times C}$ of the entire segmentation network (that is, the generative network), and a segmentation loss of the segmentation network is:

$$L_{seg} = L_{seg}^S(X_S, Y_S) + L_{seg}^T(X_T, \overline{Y}_T). \qquad (4)$$

A source domain segmentation loss $L_{seg}^S$ is defined as:

$$L_{seg}^S = (1 - \alpha)L_{clean} + \alpha L_{noise}, \text{ and} \qquad (5)$$

$$L_{clean}(p, y) = 1 - \lambda_1 \sum_{i=1}^{h \times w \times c} (y_i)\log(p_i) - \lambda_2 \frac{2\sum_{i=1}^{h \times w \times c}(y_i)p_i}{y_i^2 + p_i^2}. \qquad (6)$$

$L_{noise}$ the first noise segmentation loss, $L_{clean}$ is a segmentation loss of data (clean data) with a clean and reliable label, that is, the first noiseless segmentation loss, and $\alpha$ is a coefficient for balancing between $L_{clean}$ and $L_{noise}$.

The calculation of the adversarial loss of the discriminative network may be as follows:

$$L_D = \lambda_{adv} L_{adv}(X_S, X_T). \qquad (7)$$

$L_{adv}$ is a parameter for balancing a loss relationship of the adversarial loss during training, and $L_{adv}$ may be represented as:

$$L_{adv}(X_S, X_T) = \qquad (8)$$
$$-E[\log(D(G(X_S)))] - E[\lambda_{entr} f(X_T) + \varepsilon) + \log(1 - D(G(X_T)))].$$

$\lambda_{entr}$ is a weight parameter corresponding to an information entropy result graph, and $\varepsilon$ is added to ensure stable training in the case of $f(X_T)$. $f(X_T)$ is an information entropy calculation result of the target domain image, and may be represented as:

$$f(X_T) = \sum_i^{h \times w \times c} p_i \log(p_i). \qquad (9)$$

An information entropy map is introduced into pixel by pixel prediction of the target domain image, and then, according to the prediction, the "entropy map" is multiplied by an adversarial loss calculated for each pixel by a discriminator, thereby increasing a loss weight of a pixel (a high entropy value) with uncertainty, and reducing a loss weight (a low entropy value) with certainty. Driven by an entropy map mapping, network learning is assisted in how to focus on the most representative feature in class.

In step 103, the source domain image and the target domain image are segmented by using a generative network in a second generative adversarial network to respectively determine a second source domain segmentation loss and a second target domain segmentation loss. In an embodiment, step 103 may include segmenting each of the source domain images and the target domain images by using a generative network in a second generative adversarial network to respectively determine second source domain segmentation losses and second target domain segmentation losses.

The training of the second generative adversarial network is similar to that of the first generative adversarial network, where different structures and parameters are used. For example, for a second generative adversarial network N2, a DeepLabv3+ architecture may be used. To reduce a quantity of parameters and a calculation cost, a lightweight network MobileNetV2 is used as a basic model. The network N2 uses the first convolutional layer of MobileNetV2 and seven subsequent residual blocks to extract features. Similar to the network N1, an ASPP module is similarly added to learn underlying features in different receptive fields. ASPP with different dilation rates is used to generate multi-scale features, and semantic information of different layers is integrated into feature mapping. The feature mapping is upsampled. Then convolution is performed. The foregoing combined feature is connected to a low level feature, to perform fine-grained semantic segmentation.

For example, feature extraction may be performed on the source domain image and the target domain image by using the generative network in the second generative adversarial network to respectively obtain feature information of the source domain image and feature information of the target domain image, target segmentation is performed on the source domain image based on the feature information of the source domain image to determine the second source domain segmentation loss, and target segmentation is performed on the target domain image based on the feature information of the target domain image to determine the second target domain segmentation loss.

The second source domain segmentation loss may be determined in a plurality of manners. For example, a weighted graph (distance map) of an adversarial noise label may be introduced into the source domain image. Because medical labels have greatly varied marks at a boundary position of a target area, to prevent a network from fitting a noise label, a new anti-noise segmentation loss is provided, useful pixel level information is learned from a noise label, and an area with noise at an edge is filtered out.

For example, the source domain image includes a noisy image and a noiseless image, and target segmentation may be specifically performed on the noisy image in the source domain image based on the feature information of the source domain image to obtain a second noise segmentation probability; a weighted graph of the noisy image in the source domain image is obtained; a second noise segmentation loss is obtained according to the second noise segmentation probability and the weighted graph of the noisy image; target segmentation is performed on the noiseless image in the source domain image based on the feature information of the source domain image to obtain a second noiseless segmentation probability; a second noiseless segmentation loss is obtained according to the second noiseless segmentation probability and a labeling result of the noiseless image; and the second source domain segmentation loss is determined based on the second noise segmentation loss and the second noiseless segmentation loss.

For a specific calculation manner of the second noise segmentation loss, reference may be made to the foregoing calculation manner of the first noise segmentation loss.

For the target domain image, a specific training manner is similar to that of a preset first generative network, or a manner of adding "self-supervision" information may be added, that is, a segmentation result of the target domain image is used to generate a pixel level pseudo label, and the pseudo label is applied to a next training stage. For example, target segmentation may be specifically performed on the target domain image based on the feature information of the second target domain image to obtain a second target domain segmentation probability; a second target domain segmentation result is generated according to the second target domain segmentation probability; and the second target domain segmentation loss is obtained according to the second target domain segmentation result and the target domain image.

Next, a second source domain segmentation probability $P_S$ and a second target domain segmentation probability $P_T$ of a segmentation result outputted by the generative network in the second generative adversarial network are simultaneously inputted into a discriminative network in the second generative adversarial network, an adversarial loss $L_D$ is calculated by using an information entropy result generated by $P_T$, and at the same time a parameter of the discriminative network is updated by maximizing the adversarial loss. Subsequently, an error generated by an adversarial loss function is also transmitted back to the generative network, and a parameter of a segmentation network is updated by minimizing the adversarial loss. The objective is to make segmentation results predicted for the source domain image and the target domain image by the generative network increasingly similar, to implement field adaptivity.

For example, after a second source domain segmentation result and the second target domain segmentation result are obtained, the second source domain segmentation result and the second target domain segmentation result may be specifically discriminated by using the discriminative network in the second generative adversarial network to obtain a second discrimination result; the second generative adversarial network is trained according to the second source domain segmentation result, the second target domain segmentation result, and the second discrimination result to obtain the second generative adversarial network after training.

The second source domain segmentation result and the second target domain segmentation result may be determined in a plurality of manners. For example, information entropy of the target domain image may be specifically calculated; and the second discrimination result is obtained by using the discriminative network in the second generative adversarial network and according to the second source domain segmentation result, the second target domain segmentation result, and the target domain image.

There may be a plurality of manners of training the second generative adversarial network according to the second source domain segmentation result, the second target domain segmentation result, and the second discrimination result. For example, the second source domain segmentation loss may be specifically obtained according to the second source domain segmentation result and a labeling result of the second source domain image; the second target domain segmentation loss is obtained according to the second target domain segmentation result and the second target domain image; a second discrimination loss of the discriminative network is obtained according to the second source domain segmentation result and the second target domain segmentation result; and the second generative adversarial network is trained according to the second source domain segmentation loss, the second target domain segmentation loss, and the second discrimination loss to obtain the second generative adversarial network after training.

There may be a plurality of manners of training the second generative adversarial network according to the second source domain segmentation loss, the second target domain segmentation loss, and the second discrimination loss. For example, a minimal adversarial loss of the second generative adversarial network may be specifically built according to the second source domain segmentation loss and the second target domain segmentation loss; a maximal adversarial loss of the second generative adversarial network is built according to the second discrimination loss; and iterative training is performed on the second generative adversarial network based on the minimal adversarial loss and the maximal adversarial loss to obtain the second generative adversarial network after training.

A calculation method of each loss in the second generative adversarial network is similar to that of the first generative adversarial network. Reference may be made to the foregoing description for details.

In step 104, a first source domain image and a second source domain image are determined according to the first source domain segmentation loss and the second source domain segmentation loss, and a first target domain image and a second target domain image according to the first target domain segmentation loss and the second target domain segmentation loss. In an embodiment, step 104 includes determining a first source domain image and a second source domain image according to the first source domain segmentation losses and the second source domain segmentation losses, and determining a first target domain image and a second target domain image according to the first target domain segmentation losses and the second target domain segmentation losses.

During training, in a training manner of cross training, clean source domain image data selected from two different generative networks in each stage is used to update network parameters step by step. Specific training steps are as follows: Step 1: After N times of iteration, each generative adversarial network sorts segmentation losses of all predicted values, and two networks respectively select small loss samples $C_1$ and $C_2$ as clean data. Step 2: Each network sends these useful samples to its peer network to perform a next training process, and then updates parameters of the convolutional layer. Step 3: Each generative network reselects clean data that is considered optimal currently, and tunes its peer network in a layered manner. Because the two networks have different structures and learning capabilities, the two networks can filter errors of different types introduced by noise labels. In this exchange process, peer networks can supervise each other, thereby reducing training errors caused by noise labels.

For example, the first source domain segmentation losses may be specifically sorted, a source domain image meeting a preset loss condition is selected according to the sorted first source domain segmentation losses, and the source domain image is determined as the first source domain image; and the second source domain segmentation losses are sorted, a source domain image meeting the preset loss condition is selected according to the sorted second source domain segmentation losses, and the source domain image is determined as the second source domain image.

The preset loss condition may be, for example, a preset loss threshold. Correspondingly, the source domain image meets a preset condition, for example, when a source domain segmentation loss of the source domain image is less than the loss threshold. The preset loss condition may be alternatively that the loss threshold is minimum. Correspondingly, the source domain image that meets the preset loss condition is a source domain image with the minimum source domain segmentation loss in all source domain images.

For the target domain image, cross learning is performed on pseudo labels generated by two generative networks for the target domain image in each stage to update network parameters. Specific training steps are as follows: Step 1: Use results $PL_1$ and $PL_2$ of training results of two networks in a previous stage for the target domain as pseudo labels. Step 2: Apply the pseudo labels to a training process of another network in a next stage, to iteratively update network parameters. In each stage, the segmentation network and the discriminative network are trained in an alternate update manner. Image data is first inputted into the segmentation network, and a segmentation loss $L_{seg}$ is calculated by using a real label of the source domain data and the pseudo label of the target domain data, and a parameter of the segmentation network is updated by minimizing the segmentation loss.

For example, the first generative adversarial network may be specifically trained according to the first target domain segmentation losses, and the first target domain image is generated by using a training result; and the second generative adversarial network is trained according to the second target domain segmentation losses, and the second target domain image is generated by using a training result.

In step 105, cross training is performed on the first generative adversarial network and the second generative adversarial network by using the first source domain image, the first target domain image, the second source domain image, and the second target domain image to obtain the first generative adversarial network after training. In an embodiment, step 105 includes performing cross training on the first generative adversarial network and the second generative adversarial network by using the first source domain image, the first target domain image, the second source domain image, and the second target domain image to obtain a trained first generative adversarial network For example, the second generative adversarial network may be trained by using the first source domain image and the first target domain image. The first generative adversarial network is trained by using the second source domain image and the second target domain image.

For example, the second source domain image and the second target domain image may be specifically segmented by using the generative network in the first generative adversarial network to respectively obtain a second source domain segmentation result and a second target domain segmentation result; the second source domain segmentation result and the second target domain segmentation result are discriminated by using a discriminative network in the first generative adversarial network to obtain a second discrimination result; and training the first generative adversarial network according to the second source domain segmentation result, the second target domain segmentation result, and the second discrimination result to obtain the first generative adversarial network after training.

The second source domain segmentation result and the second target domain segmentation result may be determined in a plurality of manners. For example, information entropy of the second target domain image may be calculated; and the second discrimination result is obtained by using the discriminative network in the first generative adversarial network and according to the second source domain segmentation result, the second target domain segmentation result, and the second target domain image.

There may be a plurality of manners of training the first generative adversarial network according to the second source domain segmentation result, the second target domain segmentation result, and the second discrimination result. For example, a second source domain segmentation loss may be specifically obtained according to the second source domain segmentation result and a labeling result of the second source domain image; a second target domain segmentation loss is obtained according to the second target domain segmentation result and the second target domain image; a second discrimination loss of the discriminative network is obtained according to the second source domain segmentation result and the second target domain segmentation result; and the first generative adversarial network is trained according to the second source domain segmentation loss, the second target domain segmentation loss, and the second discrimination loss to obtain the first generative adversarial network after training.

There may be a plurality of manners of training the first generative adversarial network according to the second source domain segmentation loss, the second target domain segmentation loss, and the second discrimination loss. For example, a minimal adversarial loss of the first generative adversarial network may be specifically built according to the second source domain segmentation loss and the second target domain segmentation loss; a maximal adversarial loss of the first generative adversarial network is built according to the second target discrimination loss; and iterative training is performed on the first generative adversarial network based on the minimal adversarial loss and the maximal adversarial loss to obtain the first generative adversarial network after training.

A manner of training the second generative adversarial network by using the first source domain image and the first target domain image is similar to a training manner of the second generative adversarial network. For example, the first source domain image and the first target domain image may be specifically segmented by using the generative network in the second generative adversarial network to respectively obtain a first source domain segmentation result and a first target domain segmentation result; the first source domain segmentation result and the first target domain segmentation result are discriminated by using a discriminative network in the second generative adversarial network to obtain a first discrimination result; and the second generative adversarial network is trained according to the first source domain segmentation result, the first target domain segmentation result, and the first discrimination result to obtain the second generative adversarial network after training.

In some embodiments, the first source domain segmentation result and the first target domain segmentation result are discriminated by using the discriminative network in the second generative adversarial network, information entropy of the first target domain image may be specifically calculated, and the first discrimination result is obtained by using the discriminative network in the second generative adversarial network and according to the first source domain segmentation result, the first target domain segmentation result, and the first target domain image.

In some embodiments, the second generative adversarial network is trained according to the first source domain segmentation result, the first target domain segmentation result, and the first discrimination result. A first source domain segmentation loss may be specifically obtained according to the first source domain segmentation result and a labeling result of the first source domain image; a first target domain segmentation loss is obtained according to the first target domain segmentation result and the first target domain image; a first discrimination loss of the discriminative network is obtained according to the first source domain segmentation result and the first target domain segmentation result; and the second generative adversarial network is trained according to the first source domain segmentation loss, the first target domain segmentation loss, and the first discrimination loss to obtain the second generative adversarial network after training.

In some embodiments, a minimal adversarial loss of the second generative adversarial network may be specifically built according to the first source domain segmentation loss and the first target domain segmentation loss; a maximal adversarial loss of the second generative adversarial network is built according to the first discrimination loss; and iterative training is performed on the second generative adversarial network based on the minimal adversarial loss and the maximal adversarial loss to obtain the second generative adversarial network after training.

In step 106, a to-be-segmented image is segmented based on the generative network in the first generative adversarial network after training to obtain a segmentation result. In an embodiment, step 106 includes segmenting a to-be-segmented image based on the generative network in the trained first generative adversarial network to obtain a segmentation result.

For example, feature extraction may be specifically performed on the to-be-segmented image based on the generative network in the first generative adversarial network after training to obtain feature information of the to-be-segmented image. Target segmentation is performed on the to-be-segmented image based on the feature information of the to-be-segmented image to obtain a segmentation prediction probability of the to-be-segmented image, and a segmentation result of the to-be-segmented image is generated according to the segmentation prediction probability.

The to-be-segmented image is an image that needs to be segmented, for example, a medical image (for example, a heart image or a lung image) or some ordinary images (for example, a person image and an object image). For example, when the to-be-segmented image is a medical image, the medical image may be obtained by performing image acquisition on the tissue of a living body by the medical image acquisition device such as a CT device or an MRI device, for example, the human brain, gut, liver, heart, throat or vagina, to provide the medical image to a medical image detection apparatus. That is, the medical image detection apparatus may specifically receive the to-be-segmented image transmitted by the medical image acquisition device.

As can be seen from above, in this embodiment of this application, target domain images and source domain images that are labeled with target information are obtained first, then the source domain images and the target domain images are segmented by using a generative network in a first generative adversarial network to respectively determine a first source domain segmentation loss and a first target domain segmentation loss, the source domain image and the target domain image are segmented by using a generative network in a second generative adversarial network to respectively determine a second source domain segmentation loss and a second target domain segmentation loss, next, a first source domain image and a second source domain image are determined according to the first source domain segmentation loss and the second source domain segmentation loss, a first target domain image and a second target domain image are determined according to the first target domain segmentation loss and the second target domain segmentation loss, then cross training is performed on the first generative adversarial network and the second generative adversarial network by using the first source domain image, the first target domain image, the second source domain image, and the second target domain image to obtain the first generative adversarial network after training, and a to-be-segmented image is then segmented based on the generative network in the first generative adversarial network after training to obtain a segmentation result. The solution provides an unsupervised robust segmentation method based on a domain adaptive strategy for the phenomenon that there is noise in labels of data and a distribution difference between source domain and target domain datasets. Therefore, in the manner of mutual learning and mutual supervision between two models, labels with noise and an unsupervised image segmentation task are resolved, thereby effectively improving the accuracy of image segmentation. According to the method described in the previous embodiment, accurate segmentation of an optic cup and an optic disc of glaucoma is used as an example below for further detailed description.

To ensure that the algorithm can actually assist in clinical diagnosis, the accuracy of image segmentation needs to be improved. Embodiments of this application provide a robust unsupervised field adaptive segmentation method based on noise label data. A feature structure on a dataset with labels can be learned, knowledge is transferred to a new dataset, and relatively accurate image segmentation is provided for a new dataset without labels, thereby effectively improving the generalization performance of a deep network on other datasets.

The unsupervised field adaptive training method in this embodiment of this application may train a generative adversarial network including an image segmentation network (as a generative network) in a field adversarial manner. Next, the generative network in the trained generative adversarial network is used to segment an unlabeled to-be-segmented image. In this embodiment, an example in which the image segmentation apparatus is specifically integrated in an electronic device is used for description.

Figure 2A:
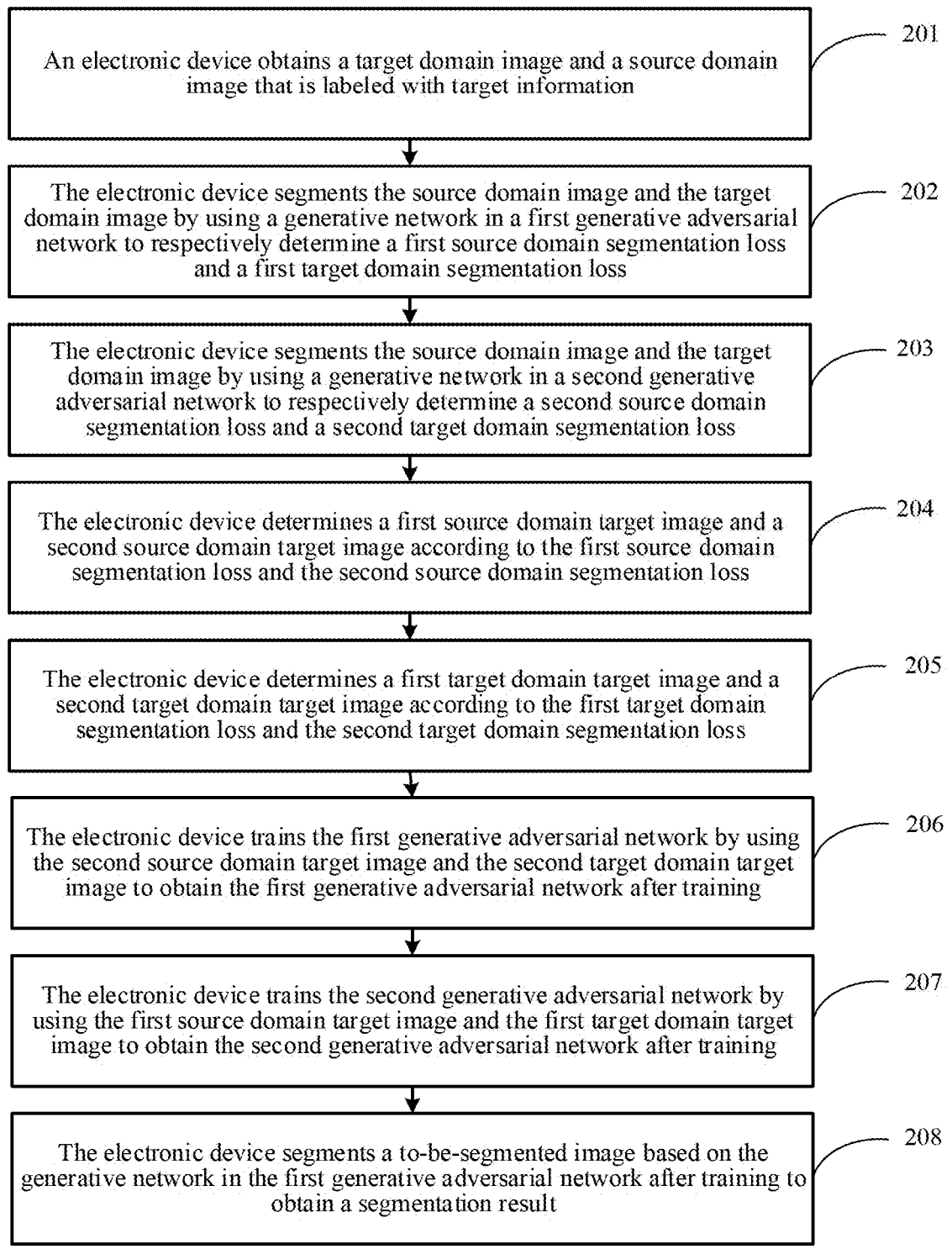
FIG. 2a is another flowchart of an image segmentation method according to an embodiment of this application.

As shown in FIG. 2a, an embodiment of this application provides an image segmentation method. A specific procedure may be as follows.

In step 201, an electronic device obtains a target domain image and a source domain image that is labeled with target information. In an embodiment, the electronic device obtains plural target domain images and plural source domain images that are labeled with target information.

Specifically, in an adaptive segmentation task of two fundus image datasets, datasets REFUGE and Drishti-GS are used. Because training sets and validation sets (or test sets) of the datasets are photographed by different acquisition devices, there are differences in color, texture, and the like of images. The training set of the REFUGE dataset is used as the source domain training set. The validation set of the REFUGE dataset and the validation set of the Drishti-GS dataset are used as target domain training sets. The test set of the REFUGE dataset and the test set of the Drishti-GS dataset are used as target domain test sets. For the REFUGE dataset, the training set includes 400 images, an image size is 2124×2056, the validation set includes 300 images, the test set includes 100 images, and an image size is 1634×1634. For the Drishti-GS dataset, the validation set includes 50 images, the test set includes 51 images, and an image size is 2047×1759.

Figure 2B:
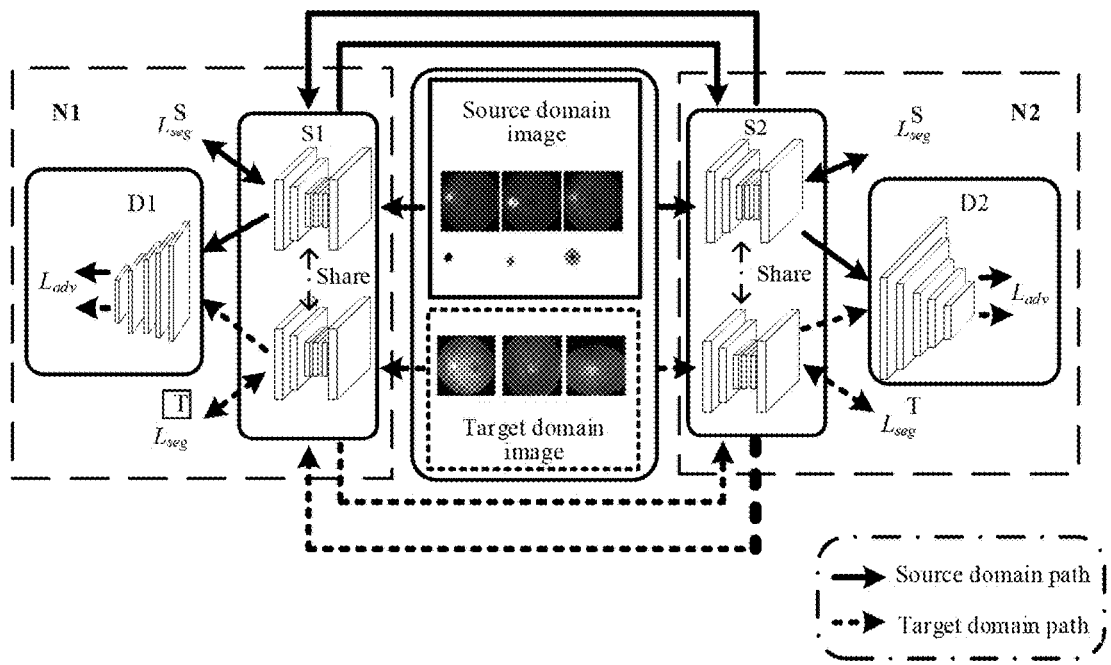
FIG. 2b is a system architecture diagram of an image segmentation method according to an embodiment of this application.

This application provides an unsupervised robust segmentation method based on a domain adaptive strategy for the phenomenon that there is a distribution difference between source domain and target domain datasets. Therefore, in the manner of mutual learning and mutual supervision between two models, an unsupervised image segmentation task is effectively resolved. A framework of the robust segmentation method shown in FIG. 2b is formed by two generative adversarial networks, that is, N1 and N2. N1 includes a generative network (also referred to as a segmentation network) S1 and a discriminative network D1. N2 includes a generative network (also referred to as a segmentation network) S2 and a discriminative network D2. The two networks have different structures and parameters. Due to the differences in the structures and parameters of the two networks, the two networks may generate different decision boundaries, that is, have different learning capabilities, thereby promoting peer-review between networks. The peer-review is a strategy for mutual review of two networks. The two networks exchange small loss data and pseudo labels, to improve the performance of the networks.

In step 202, the electronic device segments the source domain image and the target domain image by using a generative network in a first generative adversarial network to respectively determine a first source domain segmentation loss and a first target domain segmentation loss. In an embodiment, step 202 includes the electronic device segmenting one or more of the source domain images and the target domain images by using a generative network in a first generative adversarial network to respectively determine first source domain segmentation losses and first target domain segmentation losses.

Figure 2C:
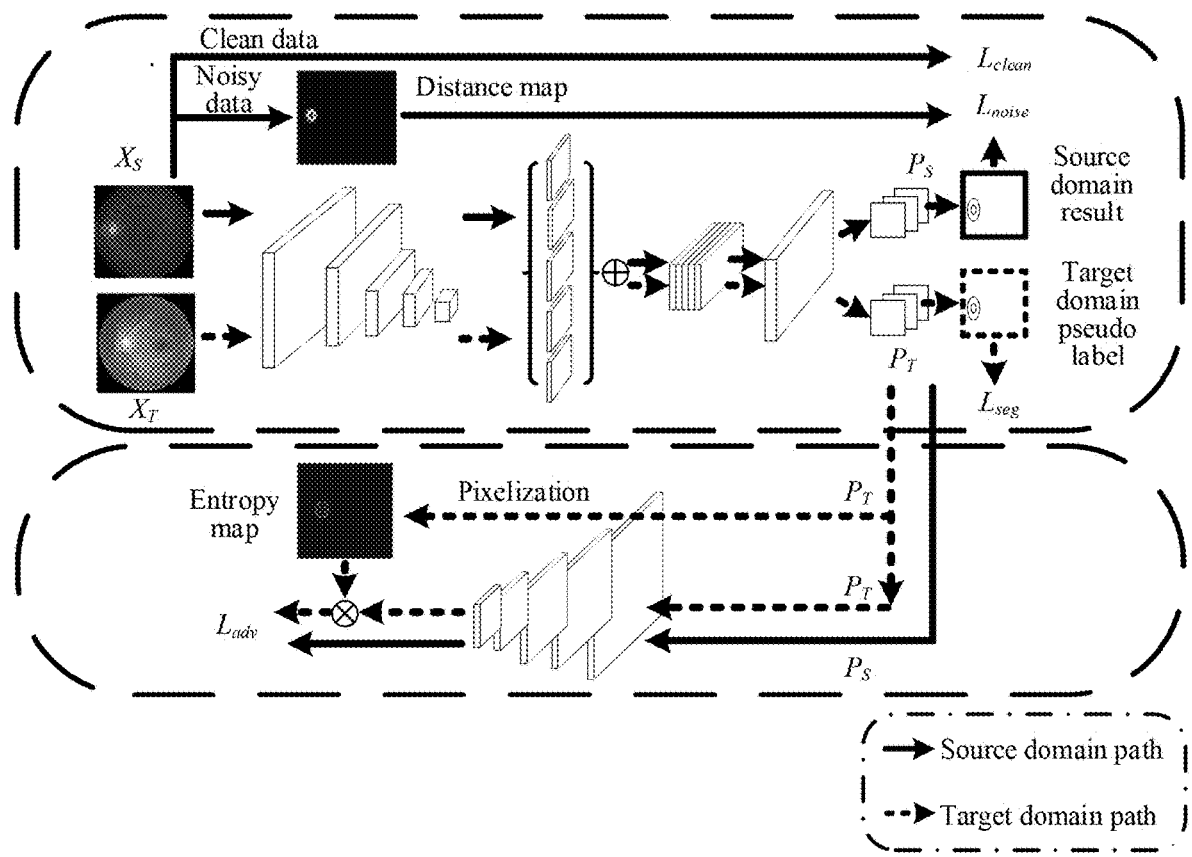
FIG. 2c is an architecture diagram of a first generative adversarial network according to an embodiment of this application.

For example, as shown in FIG. 2c, the generative network in the first generative adversarial network may use DeepLabv2 with ResNet101 as the main framework as the basic model, to implement a preliminary segmentation result. In addition, an ASPP structure is added, and multi-scale information of a feature map is enriched. To enhance the feature expression capability of the network, a DANet-based attention mechanism is provided, to learn how to capture context dependence between a pixel and a feature layer channel, and connect an output of an attention module and an output of the spatial pyramid structure to generate a final spatial segmentation feature.

For example, each source domain image includes a noisy image and a noiseless image, and a weighted graph of an adversarial noise label may be introduced into the noisy image in the source domain image. Because medical labels have greatly varied marks at a boundary position of a target area, to prevent a network from fitting a noise label, a new anti-noise segmentation loss is provided, useful pixel level information is learned from a noise label, and an area with noise at an edge is filtered out.

For example, the electronic device may specifically perform feature extraction on the source domain image by using the generative network in the first generative adversarial network to obtain feature information of the source domain image, perform target segmentation on the source domain image based on the feature information of the source domain image to obtain a first noise segmentation probability, obtain a weighted graph of the noisy image in the source domain image, and obtain a first noise segmentation loss according to the first noise segmentation probability and the weighted graph of the noisy image; perform target segmentation on the noiseless image in the source domain image based on the feature information of the source domain image to obtain a first noiseless segmentation probability; and obtain a first noiseless segmentation loss according to the first noiseless segmentation probability and a labeling result of the noiseless image, determine the first source domain segmentation loss based on the first noise segmentation loss and the first noiseless segmentation loss, and generate a first noise segmentation result according to the first noise segmentation probability. For a calculation manner of the first noise segmentation loss, reference may be made to the foregoing embodiments for details.

For example, the electronic device may specifically perform feature extraction on the target domain image by using the generative network in the first generative adversarial network to obtain feature information of the target domain image, perform target segmentation on the target domain image based on the feature information of the target domain image to obtain a first target domain segmentation probability; generate a first target domain segmentation result according to the first target domain segmentation probability; and obtain the first target domain segmentation loss according to the first target domain segmentation result and the target domain image.

Next, a first source domain segmentation probability $P_S$ and a first target domain segmentation probability $P_T$ of a segmentation result outputted by the generative network in the first generative adversarial network are simultaneously inputted into a discriminative network in the first generative adversarial network, an adversarial loss $L_D$ is calculated by using an information entropy result generated by $P_T$, and at the same time a parameter of the discriminative network is updated by maximizing the adversarial loss. Subsequently, an error generated by an adversarial loss function is also transmitted back to the generative network, and a parameter of a segmentation network is updated by minimizing the adversarial loss. The objective is to make segmentation results predicted for the source domain image and the target domain image by the generative network increasingly similar, to implement field adaptivity.

For example, the discriminative network in the first generative adversarial network may use a five-layer fully convolutional network to integrate segmentation probabilities of the source domain and the target domain into adversarial learning. A kernel size of each convolutional layer of a network model is 4, a stride is 2, and a padding is 1. In addition, one Leaky ReLU activation function layer is added to each of all convolutional layers except the last layer, to eventually output a 2D result of a single channel. 0 and 1 respectively represent a source domain and a target domain.

For example, after a first source domain segmentation result and the first target domain segmentation result are obtained, information entropy of the first target domain image may be specifically calculated; a first discrimination result is obtained by using the discriminative network in the first generative adversarial network and according to the first source domain segmentation result, the first target domain segmentation result, and the first target domain image, and then the first source domain segmentation loss is obtained according to the first source domain segmentation result and a labeling result of the first source domain image; the first target domain segmentation loss is obtained according to the first target domain segmentation result and the first target domain image; a first discrimination loss of the discriminative network is obtained according to the first source domain segmentation result and the first target domain segmentation result; and a minimal adversarial loss of the first generative adversarial network is built according to the first source domain segmentation loss and the first target domain segmentation loss; a maximal adversarial loss of the first generative adversarial network is built according to the first discrimination loss; and iterative training is performed on the first generative adversarial network based on the minimal adversarial loss and the maximal adversarial loss to obtain the first generative adversarial network after training.

For a specific calculation manner of minimizing the adversarial loss and maximizing the adversarial loss (that is, the entire target function is optimized through maximization and minimization), reference may be made to the foregoing embodiments for details.

In step 203, the electronic device segments the source domain image and the target domain image by using a generative network in a second generative adversarial network to respectively determine a second source domain segmentation loss and a second target domain segmentation loss. In an embodiment, step 203 includes the electronic device segmenting one or more of the source domain images and the target domain images by using a generative network in a second generative adversarial network to respectively determine second source domain segmentation losses and second target domain segmentation losses.

The training of the second generative adversarial network is similar to that of the first generative adversarial network, where different structures and parameters are used. For example, for a second generative adversarial network N2, a DeepLabv3+ architecture may be used. To reduce a quantity of parameters and a calculation cost, a lightweight network MobileNetV2 may be used as a basic model. The second generative adversarial network N2 uses the first convolutional layer of MobileNetV2 and seven subsequent residual blocks to extract features. A stride of the first convolutional layer and two subsequent residual blocks may be set to 2, and a stride of the remaining blocks is set to 1. A total downsampling rate of the second generative adversarial network is 8. Similar to the first generative adversarial network N1, an ASPP module is similarly added to learn underlying features in different receptive fields. ASPP with different dilation rates is used to generate multi-scale features, and semantic information of different layers is integrated into feature mapping. The feature mapping is upsampled. Then 1×1 convolution is performed. The foregoing combined feature is connected to a low level feature, to perform fine-grained semantic segmentation.

For example, the electronic device may specifically perform feature extraction on the source domain image by using the generative network in the second generative adversarial network to obtain feature information of the source domain image, and perform target segmentation on the source domain image based on the feature information of the source domain image to obtain a second noise segmentation probability; obtain a weighted graph of the noisy image in the source domain image; obtain a second noise segmentation loss according to the second noise segmentation probability and the weighted graph of the noisy image; perform target segmentation on the noiseless image in the source domain image based on the feature information of the source domain image to obtain a second noiseless segmentation probability; obtain a second noiseless segmentation loss according to the second noiseless segmentation probability and a labeling result of the noiseless image; and determine the second source domain segmentation loss based on the second noise segmentation loss and the second noiseless segmentation loss.

For a specific calculation manner of the second noise segmentation loss, reference may be made to the foregoing calculation manner of the first noise segmentation loss.

For the target domain image, a specific training manner is similar to that of a preset first generative network, or a manner of adding "self-supervision" information may be added. That is, a segmentation result of the target domain image is used to generate a pixel level pseudo label, and the pseudo label is applied to a next training stage. For example, the electronic device may specifically perform feature extraction on the target domain image by using the generative network in the second generative adversarial network to obtain feature information of a second target domain image, perform target segmentation on the target domain image based on the feature information of the second target domain image to obtain a second target domain segmentation probability; generate a second target domain segmentation result according to the second target domain segmentation probability; and obtain the second target domain segmentation loss according to the second target domain segmentation result and the target domain image.

Next, a second source domain segmentation probability $P_S$ and a second target domain segmentation probability $P_T$ of a segmentation result outputted by the generative network in the second generative adversarial network are simultaneously inputted into a discriminative network in the second generative adversarial network, an adversarial loss $L_D$ is calculated by using an information entropy result generated by $P_T$, and at the same time a parameter of the discriminative network is updated by maximizing the adversarial loss. Subsequently, an error generated by an adversarial loss function is also transmitted back to the generative network, and a parameter of a segmentation network is updated by minimizing the adversarial loss. The objective is to make segmentation results predicted for the source domain image and the target domain image by the generative network increasingly similar, to implement field adaptivity. In a process of optimizing a network parameter, in this embodiment, a Stochastic Gradient Descent (SOD) algorithm is used to optimize and train the segmentation network, an adaptive momentum stochastic optimization (Adam) algorithm is used to optimize and train the discriminative network, and initial learning rates of the segmentation network and the discriminative network are respectively $2.5 \times 10^{-4}$ and $1 \times 10^{-4}$.

For example, after a second source domain segmentation result and the second target domain segmentation result are obtained, the electronic device may specifically calculate information entropy of the target domain image; obtain the second discrimination result by using the discriminative network in the second generative adversarial network and according to the second source domain segmentation result, the second target domain segmentation result, and the target domain image; then obtain the second source domain segmentation loss according to the second source domain segmentation result and a labeling result of the source domain image; obtain the second target domain segmentation loss according to the second target domain segmentation result and the target domain image; obtain a second discrimination loss of the discriminative network according to the second source domain segmentation result and the second target domain segmentation result; next, build a minimal adversarial loss of the second generative adversarial network according to the second source domain segmentation loss and the second target domain segmentation loss; build a maximal adversarial loss of the second generative adversarial network according to the second discrimination loss; and perform iterative training on the second generative adversarial network based on the minimal adversarial loss and the maximal adversarial loss to obtain the second generative adversarial network after training.

A calculation method of each loss in the second generative adversarial network is similar to that of the first generative adversarial network. Reference may be made to the foregoing description for details.

In step 204, the electronic device determines a first source domain target image and a second source domain target image according to the first source domain segmentation loss and the second source domain segmentation loss. In an embodiment, step 204 includes the electronic device determining a first source domain image and a second source domain image according to the first source domain segmentation losses and the second source domain segmentation losses.

For example, the electronic device may specifically sort the first source domain segmentation losses, select a source domain image meeting a preset loss condition according to the sorted first source domain segmentation losses, and determine the source domain image as the first source domain image (that is, a first source domain clean image); and sort the second source domain segmentation losses, select a source domain image meeting the preset loss condition according to the sorted second source domain segmentation losses, and determine the source domain image as the second source domain image (that is, a second source domain clean image). Each generative network sends these clean images to its peer network to perform a next training process, to update parameters of the convolutional layer. Then each generative network re-selects clean data that is considered optimal currently, and tunes its peer network in a layered manner. In this exchange process, peer networks can supervise each other, thereby reducing training errors caused by noise labels.

In step 205, the electronic device determines a first target domain target image and a second target domain target image according to the first target domain segmentation loss and the second target domain segmentation loss. In an embodiment, step 205 includes the electronic device determining a first target domain image and a second target domain image according to the first target domain segmentation losses and the second target domain segmentation losses.

For example, the electronic device may specifically train the first generative adversarial network according to the first target domain segmentation losses, and generate the first target domain image by using a training result (that is, a pixel level pseudo label of the first target domain image); and train the second generative adversarial network according to the second target domain segmentation losses, and generate the second target domain image by using a training result (that is, a pixel level pseudo label of the second target domain image). These pseudo labels are then applied to a training process of another network in a next stage, to iteratively update network parameters. In each stage, the segmentation network and the discriminative network are trained in an alternate update manner.

In step 206, the electronic device trains the first generative adversarial network by using the second source domain target image and the second target domain target image to obtain the first generative adversarial network after training. In an embodiment, step 206 includes the electronic device training the first generative adversarial network according to the second source domain segmentation result, the second target domain segmentation result, and the second discrimination result to obtain the trained first generative adversarial network.

For example, the second source domain image and the second target domain image may be specifically segmented by using the generative network in the first generative adversarial network to respectively obtain a second source domain segmentation result and a second target domain segmentation result; next, information entropy of the second target domain image is calculated; and a second target discrimination result is obtained by using the discriminative network in the first generative adversarial network and according to the second source domain segmentation result, the second target domain segmentation result, and the second target domain image; then a second source domain segmentation loss is obtained according to the second source domain segmentation result and a labeling result of the second source domain image; a second target domain segmentation loss is obtained according to the second target domain segmentation result and the second target domain image; a second discrimination loss of the discriminative network is obtained according to the second source domain segmentation result and the second target domain segmentation result; then, a minimal adversarial loss of the first generative adversarial network is built according to the second source domain segmentation loss and the second target domain segmentation loss; a maximal adversarial loss of the first generative adversarial network is built according to the second discrimination loss; and iterative training is performed on the first generative adversarial network based on the minimal adversarial loss and the maximal adversarial loss to obtain the first generative adversarial network after training.

In step 207, the electronic device trains the second generative adversarial network by using the first source domain target image and the first target domain target image to obtain the second generative adversarial network after training. In an embodiment, step 207 includes the electronic device training the second generative adversarial network according to the first source domain segmentation result, the first target domain segmentation result, and the first discrimination result to obtain a trained second generative adversarial network.

For example, the electronic device may specifically segment the first source domain image and the first target domain image by using the generative network in the second generative adversarial network to respectively obtain a first source domain segmentation result and a first target domain segmentation result; calculate information entropy of the first target domain image, and obtain the first target discrimination result by using the discriminative network in the second generative adversarial network and according to the first source domain segmentation result, the first target domain segmentation result, and the first target domain image; next, obtain a first source domain segmentation loss according to the first source domain segmentation result and a labeling result of the first source domain image; obtain a first target domain segmentation loss according to the first target domain segmentation result and the first target domain image; obtain a first discrimination loss of the discriminative network according to the first source domain segmentation result and the first target domain segmentation result; then build a minimal adversarial loss of the second generative adversarial network according to the first source domain segmentation loss and the first target domain segmentation loss; build a maximal adversarial loss of the second generative adversarial network according to the first discrimination loss; perform iterative training on the second generative adversarial network based on the minimal adversarial loss and the maximal adversarial loss to obtain the second generative adversarial network after training; and then train the second generative adversarial network according to the first source domain segmentation loss, the first target domain segmentation loss, and the first discrimination loss to obtain the second generative adversarial network after training.

In step 208, the electronic device segments a to-be-segmented image based on the generative network in the first generative adversarial network after training to obtain a segmentation result. In an embodiment, step 208 includes the electronic device segmenting a to-be-segmented image based on the generative network in the trained first generative adversarial network to obtain a segmentation result.

For example, the electronic device may specifically receive a fundus image acquired by a medical imaging device, and then feature extraction is performed on the fundus image based on the generative network in the first generative adversarial network after training, to obtain feature information of the fundus image. Target segmentation is performed on the fundus image based on the feature information of the fundus image to obtain a segmentation prediction probability of the fundus image, and a segmentation result of the fundus image is generated according to the segmentation prediction probability.

Figure 2D:
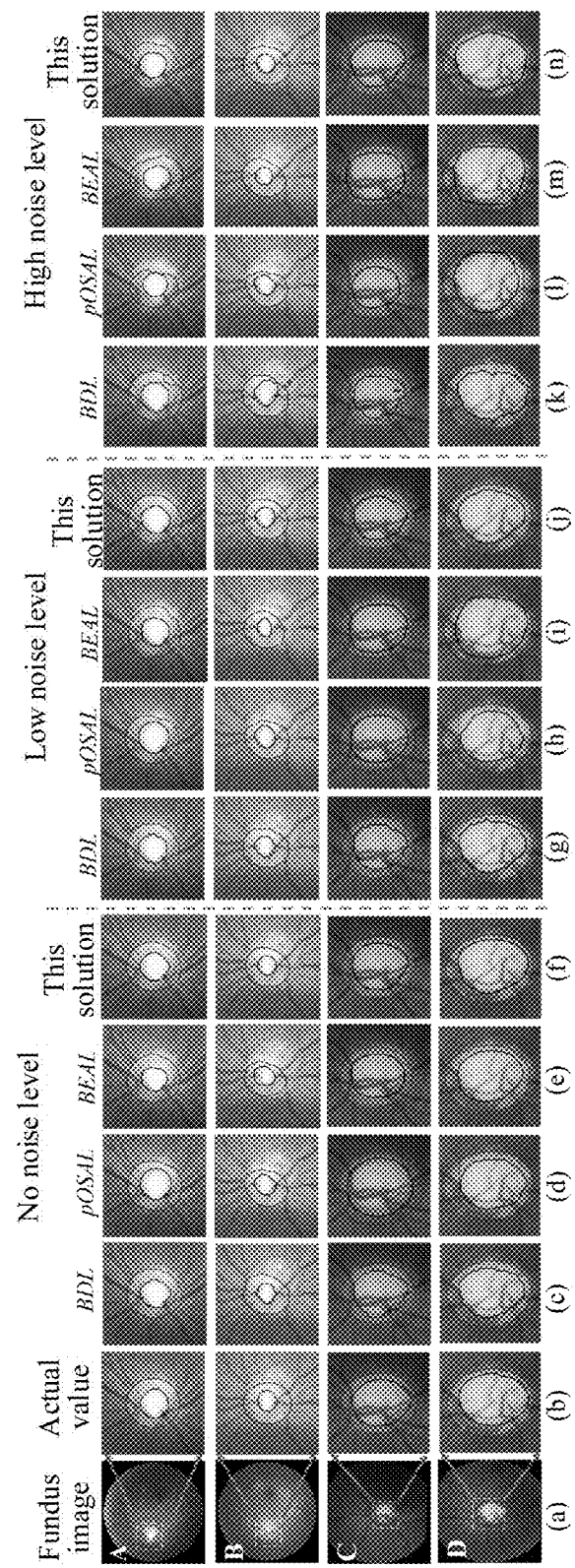
FIG. 2d is a diagram of an image segmentation result according to an embodiment of this application.

In addition, to validate the effect of the segmentation solution provided in this embodiment of this application, experimental results of the technologies provided in this application are compared with those of some related algorithms, and experimental results based on different noise grade tasks are separately shown in Table 1 and Table 2. Table 1 shows experimental results of a low noise level from the training set of REFUGE and the validation set of REFUGE. Table 2 shows experimental results of a low noise level from the training set of REFUGE and the validation set of REFUGE. In the solution, experimental results in REFUGE and Drishti-GS datasets are shown in FIG. 2*d*. BDL is a self-supervised learning-based bidirectional learning method, and is used for mitigating a domain shift problem, to learn a better segmentation model. pOSAL is OD and OC segmentation tasks of Retinal Fundus Glaucoma Challenge. BEAL provides an adversarial learning method based on edge and entropy information. In two tasks, experimental results of the method provided in this application on different noise grades and noise levels, where DI is a measurement indicator of a segmentation result, is used for calculating a similarity degree between a label Y and a predicted value P, and is represented as:

$$DI = \frac{2|p \cap Y|}{|p| + |Y|}.$$

Table 1 shows experimental results of a low noise level from the training set of REFUGE and the validation set of REFUGE

| Pre-training | Noise propor-tion | BDL | | pOSAL | | BEAL | | This solution | |
|---|---|---|---|---|---|---|---|---|---|
| | | $DI_{disc}$ | $DI_{cup}$ | $DI_{disc}$ | $DI_{cup}$ | $DI_{disc}$ | $DI_{cup}$ | $DI_{disc}$ | $DI_{cup}$ |
| Yes | 0 | 0.946 | 0.874 | 0.949 | 0.887 | 0.933 | 0.831 | 0.953 | 0.894 |
| | 0.1 | 0.948 | 0.887 | 0.954 | 0.880 | 0.931 | 0.820 | 0.951 | 0.893 |
| | 0.3 | 0.949 | 0.881 | 0.953 | 0.865 | 0.915 | 0.798 | 0.948 | 0.893 |
| | 0.5 | 0.949 | 0.890 | 0.949 | 0.859 | 0.902 | 0.805 | 0.954 | 0.896 |
| | 0.7 | 0.945 | 0.888 | 0.946 | 0.852 | 0.883 | 0.801 | 0.947 | 0.890 |
| | 0.9 | 0.942 | 0.868 | 0.945 | 0.858 | 0.877 | 0.805 | 0.953 | 0.894 |
| No | 0.1 | 0.942 | 0.867 | 0.941 | 0.879 | 0.927 | 0.771 | 0.947 | 0.884 |
| | 0.3 | 0.933 | 0.867 | 0.941 | 0.861 | 0.905 | 0.767 | 0.945 | 0.871 |
| | 0.5 | 0.932 | 0.860 | 0.940 | 0.850 | 0.878 | 0.758 | 0.948 | 0.867 |
| | 0.7 | 0.928 | 0.851 | 0.936 | 0.845 | 0.873 | 0.708 | 0.946 | 0.854 |
| | 0.9 | 0.906 | 0.765 | 0.925 | 0.836 | 0.828 | 0.691 | 0.941 | 0.846 |

Table 2 shows experimental results of a low noise level from the training set of REFUGE and the validation set of REFUGE

| Pre-training | Noise propor-tion | BDL | | pOSAL | | BEAL | | This solution | |
|---|---|---|---|---|---|---|---|---|---|
| | | $DI_{disc}$ | $DI_{cup}$ | $DI_{disc}$ | $DI_{cup}$ | $DI_{disc}$ | $DI_{cup}$ | $DI_{disc}$ | $DI_{cup}$ |
| Yes | 0.1 | 0.947 | 0.833 | 0.947 | 0.865 | 0.924 | 0.818 | 0.951 | 0.890 |
| | 0.3 | 0.916 | 0.799 | 0.869 | 0.741 | 0.912 | 0.782 | 0.947 | 0.851 |
| | 0.5 | 0.916 | 0.796 | 0.858 | 0.756 | 0.891 | 0.772 | 0.939 | 0.856 |
| | 0.7 | 0.910 | 0.757 | 0.853 | 0.751 | 0.807 | 0.719 | 0.933 | 0.845 |
| | 0.9 | 0.902 | 0.743 | 0.845 | 0.760 | 0.759 | 0.669 | 0.930 | 0.836 |
| No | 0.1 | 0.895 | 0.759 | 0.882 | 0.787 | 0.912 | 0.738 | 0.945 | 0.888 |
| | 0.3 | 0.859 | 0.761 | 0.849 | 0.769 | 0.887 | 0.689 | 0.941 | 0.848 |
| | 0.5 | 0.858 | 0.756 | 0.839 | 0.745 | 0.869 | 0.691 | 0.938 | 0.847 |
| | 0.7 | 0.853 | 0.751 | 0.804 | 0.729 | 0.799 | 0.645 | 0.932 | 0.838 |
| | 0.9 | 0.847 | 0.660 | 0.790 | 0.720 | 0.778 | 0.532 | 0.929 | 0.811 |

As can be seen from above, in this embodiment of this application, target domain images and source domain images that are labeled with target information are obtained first, then the source domain images and the target domain images are segmented by using a generative network in a first generative adversarial network to respectively determine first source domain segmentation losses and first target domain segmentation losses, the source domain images and the target domain images are segmented by using a generative network in a second generative adversarial network to respectively determine second source domain segmentation losses and second target domain segmentation losses, next, a first source domain image and a second source domain image are determined according to the first source domain segmentation losses and the second source domain segmentation losses, a first target domain image and a second target domain image are determined according to the first target domain segmentation losses and the second target domain segmentation losses, then cross training is performed on the first generative adversarial network and the second generative adversarial network by using the first source domain image, the first target domain image, the second source domain image, and the second target domain image to obtain the first generative adversarial network after training, and a to-be-segmented image is then segmented based on the generative network in the first generative adversarial network after training to obtain a segmentation result. The solution provides an unsupervised robust segmentation method based on a domain adaptive strategy for the phenomenon that there is noise in labels of data and a distribution difference between source domain and target domain datasets. Therefore, in the manner of mutual learning and mutual supervision between two models, labels with noise and an unsupervised image segmentation task are resolved, thereby effectively improving the accuracy of image segmentation.

The steps in the embodiments of this application are not necessarily performed according to a sequence indicated by step numbers. Unless otherwise explicitly specified in this application, execution of the steps is not strictly limited, and the steps may be performed in other sequences. In addition, at least some of the steps in the foregoing embodiments may include a plurality of substeps or a plurality of stages. These substeps or stages are not necessarily completed at the same moment, but may be performed at different moments. Besides, these substeps or stages may not be necessarily performed sequentially, but may be performed in turn or alternately with other steps or at least some of substeps or stages of other steps.

To better implement the foregoing method, correspondingly, an embodiment of this application further provides an image segmentation apparatus. The image segmentation apparatus may be specifically integrated in an electronic device. The electronic device may be a server or may be a terminal or may be a system including a terminal and a server.

Figure 3:
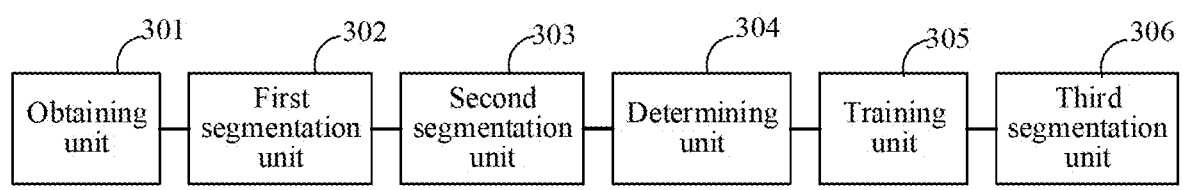
FIG. 3 is a schematic structural diagram of an image segmentation apparatus according to an embodiment of this application.

For example, as shown in FIG. 3, the image segmentation apparatus may include an obtaining unit 301, a first segmentation unit 302, a second segmentation unit 303, a determining unit 304, a training unit 305, and a third segmentation unit 306.

The obtaining unit 301 is configured to obtain a target domain image and a source domain image that is labeled with target information. In an embodiment, obtaining unit 301 is configured to obtain plural target domain images and plural source domain images that are labeled with target information.

The first segmentation unit 302 is configured to segment the source domain image and the target domain image by using a generative network in a first generative adversarial network to respectively determine a first source domain segmentation loss and a first target domain segmentation loss. In an embodiment, first segmentation unit 302 is configured to segment one or more of the source domain images and the target domain images by using a generative network in a first generative adversarial network to respectively determine first source domain segmentation losses and first target domain segmentation losses.

The second segmentation unit 303 is configured to segment the source domain image and the target domain image by using a generative network in a second generative adversarial network to respectively determine a second source domain segmentation loss and a second target domain segmentation loss. In an embodiment, second segmentation unit 303 is configured to segment one or more of the source domain images and the target domain images by using a generative network in a second generative adversarial network to respectively determine second source domain segmentation losses and second target domain segmentation losses.

The determining unit 304 is configured to: determine a first source domain target image and a second source domain target image according to the first source domain segmentation loss and the second source domain segmentation loss, and determine a first target domain target image and a second target domain target image according to the first target domain segmentation loss and the second target domain segmentation loss. In an embodiment, the determining unit 304 is configured to determine a first source domain image and a second source domain image according to the first source domain segmentation losses and the second source domain segmentation losses, and determine a first target domain image and a second target domain image according to the first target domain segmentation losses and the second target domain segmentation losses.

The training unit 305 is configured to perform cross training on the first generative adversarial network and the second generative adversarial network by using the first source domain target image, the first target domain target image, the second source domain target image, and the second target domain target image to obtain the first generative adversarial network after training. In an embodiment, the training unit 305 is configured to perform cross training on the first generative adversarial network and the second generative adversarial network by using the first source domain image, the first target domain image, the second source domain image, and the second target domain image to obtain a trained first generative adversarial network.

The third segmentation unit 306 is configured to segment a to-be-segmented image based on the generative network in the first generative adversarial network after training to obtain a segmentation result. In an embodiment, the third segmentation unit 306 is configured to segment a to-be-segmented image based on the generative network in the trained first generative adversarial network to obtain a segmentation result.

In some embodiments, the first segmentation unit 302 may include a first extraction subunit, a first segmentation subunit, and a second segmentation subunit.

The first extraction subunit is configured to perform feature extraction on the source domain image and the target domain image by using the generative network in the first generative adversarial network to respectively obtain feature information of a first source domain image and feature information of a first target domain image. In an embodiment, the first extraction subunit is configured to perform feature extraction on the source domain images and the target domain images by using the generative network in the first generative adversarial network to respectively obtain feature information of one source domain image of the source domain images and feature information of one target domain image of the target domain images.

The first segmentation subunit is configured to perform target segmentation on the source domain image based on the feature information of the first source domain image to determine the first source domain segmentation loss. In an embodiment, the first segmentation subunit is configured to perform segmentation on the one source domain image of the source domain images based on the feature information of the one source domain image to determine one of the first source domain segmentation losses.

The second segmentation subunit is configured to perform target segmentation on the target domain image based on the feature information of the first target domain image to determine the first target domain segmentation loss. In an embodiment, the second segmentation subunit is configured to perform segmentation on the one target domain image of the target domain images based on the feature information of the one target domain image to determine one of the first target domain segmentation losses.

In some embodiments, the source domain image includes a noisy image and a noiseless image, and the first segmentation subunit is specifically configured to: perform segmentation on the noisy image in the source domain image based on the feature information of the first source domain image to obtain a first noise segmentation probability; obtain a weighted graph of the noisy image in the source domain image; obtain a first noise segmentation loss according to the first noise segmentation probability and the weighted graph of the noisy image; perform segmentation on the noiseless image in the source domain image based on the feature information of the first source domain image to obtain a first noiseless segmentation probability; obtain a first noiseless segmentation loss according to the first noiseless segmentation probability and a labeling result of the noiseless image; and determine the first source domain segmentation loss based on the first noise segmentation loss and the first noiseless segmentation loss.

In some embodiments, the second segmentation subunit is specifically configured to: perform target segmentation on the target domain image based on the feature information of the first target domain image to obtain a first target domain segmentation probability; generate a first target domain segmentation result according to the first target domain segmentation probability; and obtain the first target domain segmentation loss according to the first target domain segmentation result and the target domain image.

In some embodiments, the second segmentation unit 303 may include a second extraction subunit, a third segmentation subunit, and a fourth segmentation subunit.

The second extraction subunit is configured to perform feature extraction on the source domain image and the target domain image by using the generative network in the second generative adversarial network to respectively obtain feature information of a second source domain image and feature information of a second target domain image. In an embodiment, the second extraction subunit is configured to perform feature extraction on one of the source domain images and on one of the target domain images by using the generative network in the second generative adversarial network to respectively obtain feature information of the one of the second source domain images and feature information of the one of the second target domain images.

The third segmentation subunit is configured to perform target segmentation on the source domain image based on the feature information of the second source domain image to determine the second source domain segmentation loss. In an embodiment, the third segmentation subunit is configured to perform segmentation on the one of the source domain images based on the feature information of the one of the source domain images to determine one of the second source domain segmentation losses.

The fourth segmentation subunit is configured to perform target segmentation on the target domain image based on the feature information of the second target domain image to determine the second target domain segmentation loss. In an embodiment, the fourth segmentation subunit is configured to perform segmentation on the one of the target domain images based on the feature information of the one of the target domain images to determine one of the second target domain segmentation losses.

In some embodiments, the source domain image includes a noisy image and a noiseless image, and the third segmentation subunit is specifically configured to: perform target segmentation on the noisy image in the source domain image based on the feature information of the source domain image to obtain a second noise segmentation probability; obtain a weighted graph of the noisy image in the source domain image; obtain a second noise segmentation loss according to the second noise segmentation probability and the weighted graph of the noisy image; perform target segmentation on the noiseless image in the source domain image based on the feature information of the source domain image to obtain a second noiseless segmentation probability; obtain a second noiseless segmentation loss according to the second noiseless segmentation probability and a labeling result of the noiseless image; and determine the second source domain segmentation loss based on the second noise segmentation loss and the second noiseless segmentation loss.

In some embodiments, the fourth segmentation subunit is specifically configured to: perform target segmentation on the target domain image based on the feature information of the target domain image to obtain a second target domain segmentation probability; generate a second target domain segmentation result according to the second target domain segmentation probability; and obtain the second target domain segmentation loss according to the second target domain segmentation result and the target domain image.

In some embodiments, the determining unit 304 may include a first determining subunit and a second determining subunit.

The first determining subunit may be specifically configured to: sort the first source domain segmentation loss, select a source domain image meeting a preset loss condition according to the sorted first source domain segmentation loss, and determine the source domain image as the first source domain target image; and sort the second source domain segmentation loss, select a source domain image meeting the preset loss condition according to the sorted second source domain segmentation loss, and determine the source domain image as the second source domain target image.

The second determining subunit may be specifically configured to: train the first generative adversarial network according to the first target domain segmentation loss, and generate the first target domain target image by using a training result; and train the second generative adversarial network according to the second target domain segmentation loss, and generate the second target domain target image by using a training result.

In some embodiments, the training unit 305 may include a first training subunit and a second training subunit.

The first training subunit may be specifically is configured to: segment the second source domain target image and the second target domain target image by using the generative network in the first generative adversarial network to respectively obtain a second source domain target segmentation result and a second target domain target segmentation result; discriminate the second source domain target segmentation result and the second target domain target segmentation result by using a discriminative network in the first generative adversarial network to obtain a second target discrimination result; and train the first generative adversarial network according to the second source domain target segmentation result, the second target domain target segmentation result, and the second target discrimination result to obtain the first generative adversarial network after training.

The second training subunit may be specifically configured to: segment the first source domain target image and the first target domain target image by using the generative network in the second generative adversarial network to respectively obtain a first source domain target segmentation result and a first target domain target segmentation result; discriminate the first source domain target segmentation result and the first target domain target segmentation result by using a discriminative network in the second generative adversarial network to obtain a first target discrimination result; and train the second generative adversarial network according to the first source domain target segmentation result, the first target domain target segmentation result, and the first target discrimination result to obtain the second generative adversarial network after training.

In some embodiments, the first training subunit may be specifically configured to: calculate information entropy of the second target domain target image; and obtain the second target discrimination result by using the discriminative network in the first generative adversarial network and according to the second source domain target segmentation result, the second target domain target segmentation result, and the second target domain target image.

In some embodiments, the first training subunit may be specifically configured to: obtain a second source domain target segmentation loss according to the second source domain target segmentation result and a labeling result of the second source domain target image; obtain a second target domain target segmentation loss according to the second target domain target segmentation result and the second target domain target image; obtain a second target discrimination loss of the discriminative network according to the second source domain target segmentation result and the second target domain target segmentation result; and train the first generative adversarial network according to the second source domain target segmentation loss, the second target domain target segmentation loss, and the second target discrimination loss to obtain the first generative adversarial network after training.

In some embodiments, the first training subunit may be specifically configured to: build a minimal adversarial loss of the first generative adversarial network according to the second source domain target segmentation loss and the second target domain target segmentation loss; build a maximal adversarial loss of the first generative adversarial network according to the second target discrimination loss; and perform iterative training on the first generative adversarial network based on the minimal adversarial loss and the maximal adversarial loss to obtain the first generative adversarial network after training.

In some embodiments, the second training subunit may be specifically configured to: calculate information entropy of the first target domain target image; and obtain the first target discrimination result by using the discriminative network in the second generative adversarial network and according to the first source domain target segmentation result, the first target domain target segmentation result, and the first target domain target image.

In some embodiments, the second training subunit may be specifically configured to: obtain a first source domain target segmentation loss according to the first source domain target segmentation result and a labeling result of the first source domain target image; obtain a first target domain target segmentation loss according to the first target domain target segmentation result and the first target domain target image; obtain a first target discrimination loss of the discriminative network according to the first source domain target segmentation result and the first target domain target segmentation result; and train the second generative adversarial network according to the first source domain target segmentation loss, the first target domain target segmentation loss, and the first target discrimination loss to obtain the second generative adversarial network after training.

In some embodiments, the second training subunit may be specifically configured to: build a minimal adversarial loss of the second generative adversarial network according to the first source domain target segmentation loss and the first target domain target segmentation loss; build a maximal adversarial loss of the second generative adversarial network according to the first target discrimination loss; and perform iterative training on the second generative adversarial network based on the minimal adversarial loss and the maximal adversarial loss to obtain the second generative adversarial network after training.

During specific implementations, the foregoing units may be implemented as independent entities, or may be combined, or may be implemented as the same entity or several entities. For specific implementations of the foregoing units, refer to the foregoing method embodiments. Details are not described herein again.

As can be seen from above, in embodiments of this application, the obtaining unit 301 first obtains target domain images and source domain images that are labeled with target information, the first segmentation unit 302 then segments the source domain images and the target domain images by using a generative network in a first generative adversarial network to respectively determine first source domain segmentation losses and first target domain segmentation losses, the second segmentation unit 303 segments the source domain image and the target domain image by using a generative network in a second generative adversarial network to respectively determine second source domain segmentation losses and second target domain segmentation losses, next, the determining unit 304 determines a first source domain image and a second source domain image according to the first source domain segmentation losses and the second source domain segmentation losses, and determines a first target domain image and a second target domain image according to the first target domain segmentation losses and the second target domain segmentation losses, the training unit 305 then performs cross training on the first generative adversarial network and the second generative adversarial network by using the first source domain image, the first target domain image, the second source domain image, and the second target domain image to obtain the first generative adversarial network after training, and then the third segmentation unit 306 segments a to-be-segmented image based on the generative network in the first generative adversarial network after training to obtain a segmentation result. The solution provides an unsupervised robust segmentation method based on a domain adaptive strategy for the phenomenon that there is noise in labels of data and a distribution difference between source domain and target domain datasets. Therefore, in the manner of mutual learning and mutual supervision between two models, labels with noise and an unsupervised image segmentation task are resolved, thereby effectively improving the accuracy of image segmentation.

Figure 4:
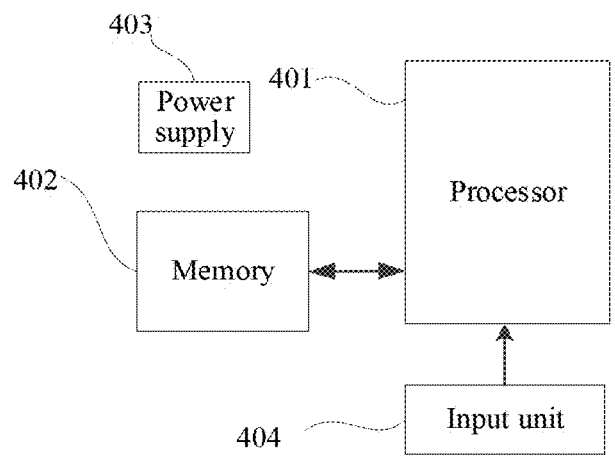
FIG. 4 is a schematic structural diagram of an electronic device according to an embodiment of this application.

In addition, an embodiment of this application further provides an electronic device. FIG. 4 is a schematic structural diagram of an electronic device according to an embodiment of this application.

The electronic device may include components such as a processor 401 (processing circuitry) with one or more processing cores, a memory 402 (non-transitory computer-readable storage medium) with one or more computer-readable storage media, a power supply 403, and an input unit 404. A person skilled in the art may understand that the electronic device structure shown in FIG. 4 does not constitute a limitation to the electronic device. The electronic device may include more or fewer components than those shown in the figure, or some components may be combined, or a different component deployment may be used.

The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device.

The processor 401 may include one or more processing cores. Preferably, the processor 401 may integrate an application processor and a communication interface, where the application processor mainly processes an operating system, a user interface, and an application program and the like, and the communication interface mainly processes wireless communication. It may be understood that the foregoing communication interface may not be integrated into the processor 401.

The memory 402 may be configured to store the software programs and modules. The processor 401 runs the software programs and modules stored in the memory 402, to perform various function application and data processing. The memory 402 may mainly include a program storage area and a data storage area. The program storage area may store the operating system, an application program required by at least one function (such as a sound playback function and an image display function), and the like. The data storage area may store data created according to use of the electronic device, and the like. In addition, the memory 402 may include a high speed random access memory, and may further include a non-volatile memory, such as at least one magnetic disk storage device, a flash memory or another volatile solid-state storage device. Correspondingly, the memory 402 may further include a memory controller, to provide access of the processor 401 to the memory 402.

The electronic device further includes the power supply 403 for supplying power to the components. Preferably, the power supply 403 may connect to the processor 401 by using a power supply management system, thereby implementing functions, such as charging, discharging, and power consumption management, by using the power supply management system. The power supply 403 may further include one or more of a direct current or alternating current power supply, a recharging system, a power failure detection circuit, a power supply converter or inverter, a power supply state indicator, and any other component.

The electronic device may further include the input unit 404. The input unit 404 may be configured to receive inputted numeric or character information and generate keyboard, mouse, joystick, optical, or trackball signal input related to user settings and function control.

Although not shown in the figure, the electronic device may further include a display unit, and the like.

Specifically, in this embodiment, the memory 402 in the electronic device stores computer-readable instructions capable of being run on the processor 401, and the processor 401 implements the following steps when executing the computer-readable instructions: obtaining target domain images and source domain images that are labeled with target information, then segmenting the source domain images and the target domain images by using a generative network in a first generative adversarial network to respectively determine first source domain segmentation losses and first target domain segmentation losses, segmenting the source domain images and the target domain images by using a generative network in a second generative adversarial network to respectively determine second source domain segmentation losses and second target domain segmentation losses, next, determining a first source domain image and a second source domain image according to the first source domain segmentation losses and the second source domain segmentation losses, determining a first target domain image and a second target domain image according to the first target domain segmentation losses and the second target domain segmentation losses, then performing cross training on the first generative adversarial network and the second generative adversarial network by using the first source domain image, the first target domain image, the second source domain image, and the second target domain image to obtain the first generative adversarial network after training, and then segmenting a to-be-segmented image based on the generative network in the first generative adversarial network after training to obtain a segmentation result.

For specific implementations of the above operations, refer to the foregoing embodiments.

As can be seen from above, in embodiments of this application, target domain images and source domain images that are labeled with target information are obtained first, then the source domain images and the target domain images are segmented by using a generative network in a first generative adversarial network to respectively determine first source domain segmentation losses and first target domain segmentation losses, the source domain images and the target domain images are segmented by using a generative network in a second generative adversarial network to respectively determine second source domain segmentation losses and second target domain segmentation losses, next, a first source domain image and a second source domain image are determined according to the first source domain segmentation losses and the second source domain segmentation losses, a first target domain image and a second target domain image are determined according to the first target domain segmentation losses and the second target domain segmentation losses, then cross training is performed on the first generative adversarial network and the second generative adversarial network by using the first source domain image, the first target domain image, the second source domain image, and the second target domain image to obtain the first generative adversarial network after training, and a to-be-segmented image is then segmented based on the generative network in the first generative adversarial network after training to obtain a segmentation result. The solution provides an unsupervised robust segmentation method based on a domain adaptive strategy for the phenomenon that there is noise in labels of data and a distribution difference between source domain and target domain datasets. Therefore, in the manner of mutual learning and mutual supervision between two models, labels with noise and an unsupervised image segmentation task are resolved, thereby effectively improving the accuracy of image segmentation.

A person skilled in the art may understand that all or part of the steps in the various methods of the foregoing embodiments may be completed by using the computer readable instruction or completed by using the computer readable instruction to control related hardware. The computer readable instruction may be stored in a non-volatile storage medium (non-transitory computer-readable storage medium), loaded and executed by the processor.

In view of this, an embodiment of this application further provides one or more non-volatile storage media storing a computer readable instruction, the computer readable instruction, when executed by one or more processors, causing the processor to perform the following steps: obtaining target domain images and source domain images that are labeled with target information, then segmenting the source domain images and the target domain images by using a generative network in a first generative adversarial network to respectively determine first source domain segmentation losses and first target domain segmentation losses, segmenting the source domain images and the target domain images by using a generative network in a second generative adversarial network to respectively determine second source domain segmentation losses and second target domain segmentation losses, next, determining a first source domain image and a second source domain image according to the first source domain segmentation losses and the second source domain segmentation losses, determining a first target domain image and a second target domain image according to the first target domain segmentation losses and the second target domain segmentation losses, then performing cross training on the first generative adversarial network and the second generative adversarial network by using the first source domain image, the first target domain image, the second source domain image, and the second target domain image to obtain the first generative adversarial network after training, and then segmenting a to-be-segmented image based on the generative network in the first generative adversarial network after training to obtain a segmentation result.

For specific implementations of the above operations, refer to the foregoing embodiments.

The non-volatile storage medium may include a read-only memory (ROM), a random access memory (RAM), a magnetic disk, an optical disc or the like.

The image segmentation method and apparatus and the storage medium provided in the embodiments of this application are described above in detail. Although the principles and implementations of this application are described by using specific examples in this specification, the descriptions of the foregoing embodiments are merely intended to help understand the method and the core idea of the method of this application. Meanwhile, a person skilled in the art may make modifications to the specific implementations and application range according to the idea of this application. In conclusion, the content of this specification is not to be construed as a limitation to this application.

What is claimed is:

1. An image segmentation method, comprising:
   obtaining plural target domain images and plural source domain images that are labeled with target information;
   segmenting one or more of the source domain images and the target domain images by using a generative network in a first generative adversarial network to respectively determine first source domain segmentation losses and first target domain segmentation losses;
   segmenting one or more of the source domain images and the target domain images by using a generative network in a second generative adversarial network to respectively determine second source domain segmentation losses and second target domain segmentation losses;
   determining a first source domain image and a second source domain image according to the first source domain segmentation losses and the second source domain segmentation losses, and determining a first target domain image and a second target domain image according to the first target domain segmentation losses and the second target domain segmentation losses;
   performing cross training on the first generative adversarial network and the second generative adversarial network by using the first source domain image, the first target domain image, the second source domain image, and the second target domain image to obtain a trained first generative adversarial network; and
   segmenting a to-be-segmented image based on the generative network in the trained first generative adversarial network to obtain a segmentation result.

2. The method according to claim 1, wherein the segmenting the source domain images and the target domain images comprises:
   performing feature extraction on the source domain images and the target domain images by using the generative network in the first generative adversarial network to respectively obtain feature information of one source domain image of the source domain images and feature information of one target domain image of the target domain images;
   performing segmentation on the one source domain image of the source domain images based on the feature information of the one source domain image to determine one of the first source domain segmentation losses; and
   performing segmentation on the one target domain image of the target domain images based on the feature information of the one target domain image to determine one of the first target domain segmentation losses.

3. The method according to claim 2, wherein each of the source domain images comprises a noisy image and a noiseless image, and the performing the segmentation on the one source domain image based on the feature information of the one source domain image to determine one of the first source domain segmentation losses comprises:
   performing segmentation on the noisy image in the one source domain image based on the feature information of the one source domain image to obtain a first noise segmentation probability;
   obtaining a weighted graph of the noisy image in the one source domain image;
   obtaining a first noise segmentation loss according to the first noise segmentation probability and the weighted graph of the noisy image;
   performing segmentation on the noiseless image in the one source domain image based on the feature information of the one source domain image to obtain a first noiseless segmentation probability;
   obtaining a first noiseless segmentation loss according to the first noiseless segmentation probability and a labeling result of the noiseless image; and
   determining the one of the first source domain segmentation losses based on the first noise segmentation loss and the first noiseless segmentation loss.

4. The method according to claim 2, wherein the performing the segmentation on the one target domain image based on the feature information of the one target domain image to determine one of the first target domain segmentation losses comprises:
- performing segmentation on the one target domain image based on the feature information of the one target domain image to obtain a first target domain segmentation probability;
- generating a first target domain segmentation result according to the first target domain segmentation probability; and
- obtaining the one of the first target domain segmentation losses according to the first target domain segmentation result and the one target domain image.

5. The method according to claim 1, wherein the segmenting the source domain images and the target domain images by using a generative network in a second generative adversarial network to respectively determine second source domain segmentation losses and second target domain segmentation losses comprises:
- performing feature extraction on one of the source domain images and on one of the target domain images by using the generative network in the second generative adversarial network to respectively obtain feature information of the one of the source domain images and feature information of the one of the target domain images;
- performing segmentation on the one of the source domain images based on the feature information of the one of the source domain images to determine one of the second source domain segmentation losses; and
- performing segmentation on the one of the target domain images based on the feature information of the one of the target domain images to determine one of the second target domain segmentation losses.

6. The method according to claim 1, wherein the determining comprises:
- sorting the first source domain segmentation losses, selecting a source domain image from among the source domain images meeting a preset loss condition according to the sorted first source domain segmentation losses, and determining the selected source domain image as the first source domain image; and
- sorting the second source domain segmentation losses, selecting a source domain image from among the source domain images meeting the preset loss condition according to the sorted second source domain segmentation losses, and determining the selected source domain image as the second source domain image.

7. The method according to claim 1, wherein the determining comprises:
- training the first generative adversarial network according to the first target domain segmentation losses, and generating the first target domain image by using a training result; and
- training the second generative adversarial network according to the second target domain segmentation losses, and generating the second target domain image by using a training result.

8. The method according to claim 1, wherein the performing the cross training comprises:
- segmenting the second source domain image and the second target domain image by using the generative network in the first generative adversarial network to respectively obtain a second source domain segmentation result and a second target domain segmentation result;
- discriminating the second source domain segmentation result and the second target domain segmentation result by using a discriminative network in the first generative adversarial network to obtain a second discrimination result;
- training the first generative adversarial network according to the second source domain segmentation result, the second target domain segmentation result, and the second discrimination result to obtain the trained first generative adversarial network;
- segmenting the first source domain image and the first target domain image by using the generative network in the second generative adversarial network to respectively obtain a first source domain segmentation result and a first target domain segmentation result;
- discriminating the first source domain segmentation result and the first target domain segmentation result by using a discriminative network in the second generative adversarial network to obtain a first discrimination result; and
- training the second generative adversarial network according to the first source domain segmentation result, the first target domain segmentation result, and the first discrimination result to obtain a trained second generative adversarial network.

9. The method according to claim 8, wherein the discriminating the second source domain segmentation result and the second target domain segmentation result by using the discriminative network in the first generative adversarial network to obtain the second discrimination result comprises:
- calculating information entropy of the second target domain image; and
- obtaining the second discrimination result by using the discriminative network in the first generative adversarial network and according to the second source domain segmentation result, the second target domain segmentation result, and the second target domain image.

10. The method according to claim 8, wherein the training the first generative adversarial network comprises:
- obtaining one of the second source domain segmentation losses according to the second source domain segmentation result and a labeling result of the second source domain image;
- obtaining one of the second target domain segmentation losses according to the second target domain segmentation result and the second target domain image;
- obtaining a second discrimination loss of the discriminative network according to the second source domain segmentation result and the second target domain segmentation result; and
- training the first generative adversarial network according to the one of the second source domain segmentation losses, the one of the second target domain segmentation losses, and the second discrimination loss to obtain the trained first generative adversarial network.

11. The method according to claim 10, wherein the training the first generative adversarial network according to the one of the second source domain segmentation losses, the one of the second target domain segmentation losses, and the second discrimination loss to obtain the trained first generative adversarial network comprises:
- building a minimal adversarial loss of the first generative adversarial network according to the one of the second source domain segmentation losses and the one of the second target domain segmentation losses;

building a maximal adversarial loss of the first generative adversarial network according to the second discrimination loss; and performing iterative training on the first generative adversarial network based on the minimal adversarial loss and the maximal adversarial loss to obtain the trained first generative adversarial network.

12. An image segmentation apparatus, comprising:
processing circuitry configured to
    obtain plural target domain images and plural source domain images that are labeled with target information;
    segment one or more of the source domain images and the target domain images by using a generative network in a first generative adversarial network to respectively determine first source domain segmentation losses and first target domain segmentation losses;
    segment one or more of the source domain images and the target domain images by using a generative network in a second generative adversarial network to respectively determine second source domain segmentation losses and second target domain segmentation losses;
    determine a first source domain image and a second source domain image according to the first source domain segmentation losses and the second source domain segmentation losses, and determine a first target domain image and a second target domain image according to the first target domain segmentation losses and the second target domain segmentation losses;
    perform cross training on the first generative adversarial network and the second generative adversarial network by using the first source domain image, the first target domain image, the second source domain image, and the second target domain image to obtain a trained first generative adversarial network; and
    segment a to-be-segmented image based on the generative network in the trained first generative adversarial network to obtain a segmentation result.

13. The image segmentation apparatus according to claim 12, wherein the processing circuitry is configured to segment the source domain images and the target domain images by
    performing feature extraction on the source domain images and the target domain images by using the generative network in the first generative adversarial network to respectively obtain feature information of one source domain image of the source domain images and feature information of one target domain image of the target domain images;
    performing segmentation on the one source domain image of the source domain images based on the feature information of the one source domain image to determine one of the first source domain segmentation losses; and
    performing segmentation on the one target domain image of the target domain images based on the feature information of the one target domain image to determine one of the first target domain segmentation losses.

14. The image segmentation apparatus according to claim 13, wherein each of the source domain images comprises a noisy image and a noiseless image, and the processing circuitry is configured to perform the segmentation on the one source domain image based on the feature information of the one source domain image to determine one of the first source domain segmentation losses by
    performing segmentation on the noisy image in the one source domain image based on the feature information of the one source domain image to obtain a first noise segmentation probability;
    obtaining a weighted graph of the noisy image in the one source domain image;
    obtaining a first noise segmentation loss according to the first noise segmentation probability and the weighted graph of the noisy image;
    performing segmentation on the noiseless image in the one source domain image based on the feature information of the one source domain image to obtain a first noiseless segmentation probability;
    obtaining a first noiseless segmentation loss according to the first noiseless segmentation probability and a labeling result of the noiseless image; and
    determining the one of the first source domain segmentation losses based on the first noise segmentation loss and the first noiseless segmentation loss.

15. The image segmentation apparatus according to claim 13, wherein the processing circuitry is configured to perform the segmentation on the one target domain image based on the feature information of the one target domain image to determine one of the first target domain segmentation losses by
    performing segmentation on the one target domain image based on the feature information of the one target domain image to obtain a first target domain segmentation probability;
    generating a first target domain segmentation result according to the first target domain segmentation probability; and
    obtaining the one of the first target domain segmentation losses according to the first target domain segmentation result and the one target domain image.

16. The image segmentation apparatus according to claim 12, wherein the processing circuitry is configured to segment the source domain images and the target domain images by using a generative network in a second generative adversarial network to respectively determine second source domain segmentation losses and second target domain segmentation losses by
    performing feature extraction on one of the source domain images and on one of the target domain images by using the generative network in the second generative adversarial network to respectively obtain feature information of the one of the source domain images and feature information of the one of the target domain images;
    performing segmentation on the one of the source domain images based on the feature information of the one of the source domain images to determine one of the second source domain segmentation losses; and
    performing segmentation on the one of the target domain images based on the feature information of the one of the target domain images to determine one of the second target domain segmentation losses.

17. The image segmentation apparatus according to claim 12, wherein the processing circuitry is configured to perform the determining by
    sorting the first source domain segmentation losses, selecting a source domain image from among the source domain images meeting a preset loss condition according to the sorted first source domain segmentation losses, and determining the selected source domain image as the first source domain image; and sorting the second source domain segmentation losses, selecting a source domain image from among the source domain images meeting the preset loss condition according to the sorted second source domain segmentation losses, and determining the selected source domain image as the second source domain image.

18. The image segmentation apparatus according to claim 12, wherein the processing circuitry is configured to perform the determining by training the first generative adversarial network according to the first target domain segmentation losses, and generating the first target domain image by using a training result; and training the second generative adversarial network according to the second target domain segmentation losses, and generating the second target domain image by using a training result.

19. The image segmentation apparatus according to claim 12, wherein the processing circuitry is configured to perform the cross training by segmenting the second source domain image and the second target domain image by using the generative network in the first generative adversarial network to respectively obtain a second source domain segmentation result and a second target domain segmentation result;

discriminating the second source domain segmentation result and the second target domain segmentation result by using a discriminative network in the first generative adversarial network to obtain a second discrimination result;

training the first generative adversarial network according to the second source domain segmentation result, the second target domain segmentation result, and the second discrimination result to obtain the trained first generative adversarial network;

segmenting the first source domain image and the first target domain image by using the generative network in the second generative adversarial network to respectively obtain a first source domain segmentation result and a first target domain segmentation result;

discriminating the first source domain segmentation result and the first target domain segmentation result by using a discriminative network in the second generative adversarial network to obtain a first discrimination result; and training the second generative adversarial network according to the first source domain segmentation result, the first target domain segmentation result, and the first discrimination result to obtain a trained second generative adversarial network.

20. A non-transitory computer-readable storage medium storing computer-readable instructions thereon which, when executed by a processor, cause the processor to perform an image segmentation method comprising:

obtaining plural target domain images and plural source domain images that are labeled with target information;

segmenting one or more of the source domain images and the target domain images by using a generative network in a first generative adversarial network to respectively determine first source domain segmentation losses and first target domain segmentation losses;

segmenting one or more of the source domain images and the target domain images by using a generative network in a second generative adversarial network to respectively determine second source domain segmentation losses and second target domain segmentation losses;

determining a first source domain image and a second source domain image according to the first source domain segmentation losses and the second source domain segmentation losses, and determining a first target domain image and a second target domain image according to the first target domain segmentation losses and the second target domain segmentation losses;

performing cross training on the first generative adversarial network and the second generative adversarial network by using the first source domain image, the first target domain image, the second source domain image, and the second target domain image to obtain a trained first generative adversarial network; and segmenting a to-be-segmented image based on the generative network in the trained first generative adversarial network to obtain a segmentation result.

* * * * *